(12) United States Patent
Duzak et al.

(10) Patent No.: US 8,032,821 B2
(45) Date of Patent: Oct. 4, 2011

(54) MULTI-THREAD SPREADSHEET PROCESSING WITH DEPENDENCY LEVELS

(75) Inventors: Jeffrey J. Duzak, Redmond, WA (US);
Andrew Becker, Bellevue, WA (US);
Matthew J. Androski, Bellevue, WA (US); Duane Campbell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1166 days.

(21) Appl. No.: 11/430,486

(22) Filed: May 8, 2006

(65) Prior Publication Data
US 2007/0260667 A1    Nov. 8, 2007

(51) Int. Cl.
*G06F 17/12* (2006.01)
(52) U.S. Cl. .......................................... 715/212; 712/28
(58) Field of Classification Search ........... 715/212–220
See application file for complete search history.

(56) References Cited

U.S. PATENT DOCUMENTS

| | | | | |
|---|---|---|---|---|
| 5,276,607 | A * | 1/1994 | Harris et al. | 345/467 |
| 5,535,393 | A * | 7/1996 | Reeve et al. | 717/149 |
| 5,694,603 | A | 12/1997 | Reiffin | |
| 5,862,400 | A * | 1/1999 | Reed et al. | 712/34 |
| 5,913,925 | A * | 6/1999 | Kahle et al. | 712/206 |
| 5,943,663 | A | 8/1999 | Mouradian | |
| 5,970,506 | A * | 10/1999 | Kiyan et al. | 715/212 |
| 6,055,548 | A * | 4/2000 | Comer et al. | 715/212 |
| 6,138,130 | A | 10/2000 | Adler et al. | |
| 6,205,465 | B1 * | 3/2001 | Schoening et al. | 718/102 |
| 6,304,866 | B1 | 10/2001 | Chow et al. | 707/2 |
| 6,330,661 | B1 | 12/2001 | Torii | 712/228 |
| 6,349,295 | B1 | 2/2002 | Kessman et al. | |
| 6,389,446 | B1 * | 5/2002 | Torii | 718/100 |
| 6,430,584 | B1 | 8/2002 | Comer et al. | |
| 6,560,606 | B1 * | 5/2003 | Young | 707/100 |
| 6,795,845 | B2 | 9/2004 | Kalafatis et al. | 718/108 |
| 6,934,910 | B2 | 8/2005 | Lange | 715/538 |
| 6,957,191 | B1 | 10/2005 | Belcsak et al. | 705/38 |
| 7,010,779 | B2 | 3/2006 | Rubin et al. | 717/106 |
| 7,454,595 | B1 * | 11/2008 | Pedretti | 712/30 |

(Continued)

FOREIGN PATENT DOCUMENTS

EP    1 152 331    11/2001

(Continued)

OTHER PUBLICATIONS

Minami, Parallel Spreadsheet Processing, Feb. 15, 1994, Japan Advanced Institute of Science and Technology, Hokuriku, pp. 1-4.*

(Continued)

*Primary Examiner* — Laurie Ries
*Assistant Examiner* — Frank D Mills
(74) *Attorney, Agent, or Firm* — Merchant & Gould P.C.

(57) ABSTRACT

This disclosure relates to a method and system of processing chain calculations in spreadsheet applications utilizing multiple processors, each having a separate recalculation engine. A single calculation chain may be reordered into a unified chain where supporting and dependent formulas are organized into a tree hierarchy of child chains. The unified chain is further divided into dependency levels, where entries in each dependency level may be moved to a next dependency level during reordering. If an entry within a dependency level is dependent upon another entry not found within its own child chain, the unified chain is ordered such that an entry is only dependent upon an entry in a prior dependency level. Further, dependency levels allow a control thread to perform control-thread-only operations while maintaining multi-thread processing capabilities.

20 Claims, 18 Drawing Sheets

U.S. PATENT DOCUMENTS

| | | | | |
|---|---|---|---|---|
| 7,533,139 | B2* | 5/2009 | Jones et al. | 708/200 |
| 2001/0056440 | A1* | 12/2001 | Abramson et al. | 707/504 |
| 2002/0184261 | A1 | 12/2002 | Yamane | 715/503 |
| 2002/0198888 | A1* | 12/2002 | Young | 707/100 |
| 2003/0014473 | A1* | 1/2003 | Ohsawa et al. | 709/107 |
| 2003/0106040 | A1* | 6/2003 | Rubin et al. | 717/106 |
| 2003/0167389 | A1 | 9/2003 | Soltis, Jr. et al. | 712/220 |
| 2003/0233313 | A1 | 12/2003 | Bartolucci | |
| 2004/0103366 | A1 | 5/2004 | Peyton-Jones et al. | 715/503 |
| 2004/0139433 | A1 | 7/2004 | Blythe et al. | 718/100 |
| 2004/0148603 | A1 | 7/2004 | Baylis | 718/100 |
| 2004/0194074 | A1* | 9/2004 | Shibayama et al. | 717/151 |
| 2004/0210822 | A1 | 10/2004 | Kotler et al. | |
| 2004/0249852 | A1 | 12/2004 | Aureglia et al. | |
| 2004/0255238 | A1* | 12/2004 | Bushel et al. | 715/503 |
| 2005/0050088 | A1 | 3/2005 | Kotler et al. | |
| 2005/0267853 | A1 | 12/2005 | Netz et al. | |
| 2006/0069993 | A1* | 3/2006 | Jones et al. | 715/538 |
| 2006/0117246 | A1 | 6/2006 | Bauchot et al. | |
| 2006/0129929 | A1* | 6/2006 | Weber et al. | 715/538 |
| 2006/0282839 | A1* | 12/2006 | Hankins et al. | 719/318 |

FOREIGN PATENT DOCUMENTS

| | | | |
|---|---|---|---|
| GB | 2394333 A | * | 4/2004 |
| WO | WO 2007/145742 A3 | | 12/2007 |

OTHER PUBLICATIONS

Nadiminti et al., ExcelGrid: A .NET Plug-in for Outsourcing Excel Spreadsheet Workload to Enterprise and Global Grids, , Dec. 15-18, 2004, ADCOM 2004 Proceedings of the 12th International Conference on Advanced Computing and Communication, pp. 1-13. Retrieved from http://www.gridbus.org/publications-years.html.*

Abramson, et al., "ActiveSheets: Super-Computing with Spreadsheets". 2001 High Performance Computing Symposium (HPC'01), Advanced Simulation Technologies Conference, Apr. 22-26, 2001, pp. 110-115, Seattle, Washington (USA). http://www.csse.monash.edu.au/~davida/papers/ActiveSheets.pdf.

Luther, et al., "Alchemi: A .NET-based Grid Computing Framework and its Integration into Global Grids." Technical Report, GRIDS-TR-2003-8 (2003). www.alchemi.net/files/alchemi_techreport.pdf.

Press release: "Decisioneering Announces CB Turbo for Crystal Ball, Industry's First Distributed Spreadsheet Analysis Engine" Mar. 24, 2006. http://www.crystalball.com/press/press_cbt10.html.

Nadiminti, et al., "ExcelGrid: A .NET Plug-in for Outsourcing Excel Spreadsheet Workload to Enterprise and Global Grids", Technical Report, GRIDS-TR-2004-8, Grid Computing and Distributed Systems Laboratory, University of Melbourne, Australia, Aug. 17, 2004. www.gridbus.org/papers/ExcelGrid.pdf.

Wang, et al., "Loop Selection for Thread-Level Speculation." Workshops on Languages and Compilers for Parallel Computing, Hawthorne, New York, USA, Nov. 2-4, 2006. www.csc.lsu.edu/lcpc05/papers/lcpc05-paper-42.pdf.

Andrews, Dave; Trask, Matt, "OS/2 Gets Lean and Mean," Byte, V.19, N8, p. 26-27, Aug. 1994.

Balakrishnan, Jaydeep; et al. "Manufacturing Cell Formation Using Spreadsheets: Formulation and Comparison," Conference: Western Decision Sciences Institute—Annual meeting 1994.

Baumann, Knut. Accord for Excel,: IEE, 1997.

Berghaus, Nona. "Teach Spreadsheet Proficiency with Personal Money Management Projects," IEE, Apr. 1990.

Beynon, W.M.; et al. "Programming Principles for Visualization in Mathematical Research," IEE, 1991.

Bland, C.J. "Using Spread-Sheet Software for Radiometric Spectral Analysis," IEE Sep.-Oct. 1996.

Brown, A.M., "Simulation of Axonal Excitability Using a Spreadsheet Template Created in Microsoft Excel," Computer Methods and Programs in Biomedicine, Vo.63, N.1, p. 47-54, Aug. 2000.

Brown, A.M. A Methodology for Simulating Biological Systems Using Microsoft Excel,: IEE, 1999.

Burke, Andrew F. "A Method for the Analysis of High Power Battery Designs," IEE, 1997.

Byington, Ian. "Statistics Spreadsheets for School Sports Teams," IEE, Nov. 1990.

Cahill, M.B.; Teaching Chain-Weight Real GDP Measures,: Journal of Economic Education, 2003, V34, N3, pp. 224-234.

Chains, Markov. "Search Process Evaluation for a Hierarchical Menu System ," IEE,, 2001.

Chan, BO. "Defects in Silicon Solar Cell Materials," ProQuest Info & Learning, Mar. 1993, [317 pages].

Chen, JJ; Zheng, GL, "NDC++: An Approach to Concurrent Extension of C++," Journal: ACM SIGPLAN Notices, V32, N3, p. 50-56 (Mar. 1997).

Chi, E.J. et al., "A Spreadsheet Approach to Information Visualization," IEEE Symposium on Information Visualization, p. 17-24.

Chi, Ed Haui-Hsin. "A Framework for Information Visualization Spreadsheets (User Interface)," vol. 60/03-B, Dissertation Abstracts International, 1999, p. 1161.

Clarke, R., "Module Interconnection Frameworks for a Real-Time Spreadsheet," TRware, Inc., Oct. 19, 1993.

Clarkson, Barnard. "Spreadsheets Are a Language Too! 2 or a Step by Step Teaching Strategy for Spreadsheets," IEE, Dec. 1990.

Collins, M.T.; Morgan, I.R. "Epidemiologic Model of Paratuberculosis in Dairy-Cattle," 2004 Inst. For Sci. Info.

Collins, Michael T.; Morgan, Ian. R. "Simulation-Model of Paratuberculosis Control in a Dairy-Herd," 2004 Inst. For Sci. Info.

Galletta, Dennis F..; et al. "An Experimental Study of Spreadsheet Presentation and Error Detection," IEE, 1996.

Gaul, Wayne; Underhill, Dwight. "A Simple Calculation for the Buildup and Decay of Radon Progeny," IEE,, Jun. 2001.

Gaylarde, Peter M.; Gaylarde, Christine C. "A Theoretical Model Describing the Influence of Diffusion on Microbicidal Action in Biofilms," 2004 Inst. For Sci. Info.

Haley, Sue. AppleMgr: A Prototype Decision Aid for Apple Pest Management, ProQuest Info & Learning, 1990, [136 pages].

Haney, S.W.; et al. "The Optimized NIF Laser System Based on ICF Target Requirements," IEE, 1997.

Heckman, J.L.; Hoffman, J.; Shaffer, T.H.; Wolfson, M.R., "Software for Real-Time Control of a Tidal Liquid Ventilator," Journal: Biomedical Instrumentation & Technology, V.33, N.3, p. 268-76, May-Jun. 1999.

Herter, Gerald. "Two Spreadsheet Productivity Packages," IEE,, Jul. 1992.

Holdich, R. "Simulation of Compressible Cake Filtration," Elsevier Eng. Info. Inc., 1994.

Kalogirou, Soteris. "Economic Analysis of Solar Energy Systems Using Spreadsheets," Proceedings 1996 World Renewable Energy Congress on Renewable Energy, Energy Efficiency and the Environment, 1996.

Keasler, Terrill R. Applying Computer Technology in a Financial Management: An Example of the Amortization Schedule,: IEE, 2000.

Lee, E.P.; et al. "Physics Design and Scaling of Elise," Fusion Engineering and Design 32-33 (1996), pp. 323-335.

Leopold, Jennifer L.; Ambler, Allen L. "A User Interface for the Visualization and Manipulation of Arrays," IEE, 1996.

Levoy, Marc. "Spreadsheets for Images," IEE, 1994.

McHugh, J.M.; Kenyon, J. L. "An Excel-based Model of Ca2+ Diffusion and Fura 2 Measurements in a Spherical Cell," 2004 Inst. For Sci. Info.

Mittermeir et al., "Finding High-Level Structures in Spreadsheet Programs," Proceedings 9th Working conf. on Reverse Engineering WCRE 2002, pp. 221-232.

Morely, Lloyd A.; Novak, Thomas. "Impedance-Based Power-system Analysis Using a Spreadsheet," IEE, 1990.

Morishita, Etsuo. "Spreadsheet Fluid Dynamics," 2004 the HW Wilson Co No. BAST 99051108.

Mu, X.M.; Marchionini G., "An Architecture and Prototype Interface for an Online Statistical Table Browser," 64th ASIST Annual Meeting, vol. 38, 2001.

Mundkur, Siddharth Dinesh. "Separation Process Synthesis: A Knowledge-Based System Using Spreadsheet Macros,".

Nadiminti, et al., "ExcelGrid: A .NET Plug-in for Outsourcing Excel Spreadsheet Workload to Enterprise and Global Grids", Technical Report, GRIDS-TR-2004-8, Grid Computing and Distributed Systems Laboratory, University of Melbourne, Australia, Aug. 17, 2004. www.gridbus.org/papers/ExcelGrid.pdf.
Ottinger, Thomas Patrick. "Conceptual and Procedural Learning in First-Year Algebra Using Graphing Calculators and Computers," Conceptual Learning, Algebra, Calculators, ProQuest Info & Learning, 1993, pp. 1-171.
Padawitz, Peter. "Swinging Data Types—Syntax, Semantics, and Theory," 2004 Inst. For Sci. Info.
Parow, Ketil. "Designing a Horn Loudspeaker," Elsevier Eng. Info. Inc., 1996.
Pinero Mendez, Mayra I. "Development of Cost Models for Electronics Assemblies," ProQuest Information and Learing, May 25, 2001, pp. 1-418.
Pountian, Dick. "Starting with a Clean Sheet," 2004 The HW Wilson Co. No. BAST94065730.
Robert, Christian P.; et a;l. "Convergence Controls for MCMC Algorithms, with Applications to Hidden Markov Chains," 2004 INIST/CNRS.
Ruddle, AR. Benefits of General Purpose Mathematical Software in Modelling Electronic Systems,: IEE, 1998.
Saariluoma, Pertti; Sajaniemi, Jorma. "Transforming Verbal Descriptions into Mathematical Formulas in Spreadsheet Calculation," IEEE, Dec. 1994.
Salmi, U.; et al. "CRISY: A CRItical Assemblies Documentation SYstem," IEE, 1990.
Sathaye, J.; et al. "A Comprehensive Mitigation Assessment Process (COMAP) for the Evaluation of Forestry Mitigation Options," 2004 Inst. For Sci. Info.
Scoville, R., "Spreadsheets. A Total of One (Windows 95)", Journal: PC World, V.13, N.10, p. 151, Oct. 1995.
Seppala, Ulla; Holmstrom, Jan. "Rough Modeling of Logistics Networks," IEE, 1995.
Sheriff, Steven D. "Forward Modeling of Electrical Sounding Experiments Using Convolution and a Spreadsheet," IEE, Jan. 1992.
Spenke, Michael et al.; InfoZoom: Analysing Formula One Racing Results with an Interactive Data Mining and Visualisation Tool; Data Mining II: Cambridge, Jul. 5-7, 2000.
Stent, Alan F.; McCallum, Ian R. "Dynamic Simulation Modeling on a Spreadsheet," 2004 FIZ Technik.
Tetewsky, A.K., "GUI Development for Real-Time Applications," Journal: Dr. Dobb's Journal, V.19, N.6, pp. 28,30,32,26,38,40-41, Jun. 1994.
Towler, Brian F.; et al. "Spreadsheet Determines Hyperbolic-Decline Parameters," 2004 The HW Wilson Co. No. BAST94022046.
Trahan, Jr., Russell E.; et al. "An Improved Method for Design of Recursive Digital Filters Using Optimization," IEE, Jul. 1995.
Usuda, Shouji et al. Computer-Simulation with Spreadsheet to Analyze Crystalline Structure in Phase Change Recording Layer by Fractal Theory,: IEE,, 2001.
Walter, Donnal C.; McMillan, Michael M. "A Spreadsheet Method for Studying Neural Networks," IEE, 1990.
Wu, Sheng-Nan. "Simulations of the Cardiac Action Potential Based on the Hodgkin-Huxley Kinetics with the Use of Microsoft Excel Spreadsheets," 2004 Inst. For Sci. Info.
Zaghloul, Nabil A. "Unsteady Gradually Varied Flow in Circular Pipes with Variable Roughness," IEE,, Mar. 1997.
First Office Action, State Intellectual Property Office of the People's Republic of China, App. No. 200510089360.4, dated May 16, 2008.
Second Office Action, State Intellectual Property Office of the People's Republic of China, App. No. 200510089360.4, dated Oct. 24, 2008.
European Search Report, European Patent Office, App. No. EP 05 105 810.5, dated Mar. 17, 2008.
Official Communication, European Patent Office, App. No. EP 05 105 810.5, dated Jun. 12, 2008.
Written Opinion of the International Searching Authority and International Search Report in PCT Application No. PCT/US2007/011189, mailed Jan. 4, 2008.
Supplementary EU Search Report for Application No. 07815088.5—dated Dec. 14, 2010.
A. Grama et al. (2003), *Introduction to Parallel Computing*. Pearson, Addison Wesley. Chapter 3, (39 pp.). "Principles of parallel algorithm design".
First Office Action, State Intellectual Property Office of the People's Republic of China, App. No. 200820016503.6, dated Mar. 10, 2010, (10 pp).
International Preliminary Report on Patentability and Written Opinion of the International Searching Authority on EP Application No. PCT/US2007/011189 issued Nov. 11, 2008, (9 pp.).
NOA dated Feb. 20, 2008 in U.S. Appl. No. 10/951,576, (10 pp.).
NOA dated Dec. 17, 2008 in U.S. Appl. No. 10/951,576, (4 pp.).
Office Action (non-final) dated Feb. 1, 2007 issued in U.S. Appl. No. 10/951,576, (5 pp.).
Office Action (non-final) dated Jul. 19, 2007 issued in U.S. Appl. No. 10/951,576, (4 pp.).
Office Action (non-final) dated Aug. 1, 2008 issued in U.S. Appl. No. 10/951,576, (7 pp.).
Official Communication, European Patent Office, App. No. 05105810.5, dated Oct. 19, 2009, (7 pp.).
Third Office Action, State Intellectual Property Office of the People's Republic of China, App. No. 200510089360.4, dated Feb. 20, 2009, (10 pp.).
First Office Action, State Intellectual Property Office of the People's Republic of China, App. No. 200780016503.6, dated Mar. 10, 2010, (10 pp).
Notice of Rejection mailed Mar. 29, 2011 in Japanese Patent Application No. 2005-184988, (with Translation), 6 pgs.
Notice on Grant of Patent Right for Invention mailed Jul. 17, 2009 in Chinese Application No. 200510089360.4, 4 pgs.
Response dated Apr. 28, 2010 to Official Communication dated Oct. 28, 2010 in EP Application No. 05105810.5, 19 pgs.
Amendment and Response filed May 1, 2007 to Office Action filed Feb. 1, 2007 in U.S. Appl. No. 10/951,576, 12 pgs.
Amendment and Response filed Dec. 19, 2007 to Office Action filed Jul. 19, 2007 in U.S. Appl. No. 10/951,576, 12 pgs.
Preliminary Amendment filed May 20, 2008 to NOA filed Feb. 20, 2008 in U.S. Appl. No. 10/951,576, 10 pgs.
Amendment and Response filed Nov. 3, 2008 to Office Action filed Aug. 1, 2008 in U.S. Appl. No. 10/951,576, 18 pgs.

* cited by examiner

400 ↙

|   | A | B | C |
|---|---|---|---|
| 1 | =1 | =1 | |
| 2 | =A1 | =B1 | |
| 3 | =A2 | =B2 | =A3+B3 |

402 — row 1
404 — row 2
406 — row 3

500 ↙

MULTI-THREAD SPREADSHEET PROCESSING WITH DEPENDENCY LEVELS

BACKGROUND

The use of spreadsheet applications for data analysis has become prevalent. Further, as more and more businesses depend upon these applications for complex data computation, the need for faster and more efficient processing of these applications has become desirable. Microsoft Excel™ is an example of such a spreadsheet application. It is typical in spreadsheet applications for a formula in one cell, referred to as a "dependent" formula, to depend upon the contents of or a formula in another cell, referred to as a "supporting" formula. When the contents of a cell are changed, a recalculation ("recalc") operation may be triggered, in which a program thread is used to iterate through the formulas and recalc any formulas requiring recalculation based on these changes. The processing time for computation operations may be reduced in speed, if not paused altogether for a significant period of time, when a recalc program thread confronts a formula dependent upon a supporting formula which has yet to be calculated. Even where multiple processors, or multiple program threads, are employed in such applications, the performance speed of the calculations and recalcs may not be improved where at least one of the processors is unable to complete a calculation or recalc while waiting for a supporting formula to be computed. The problem is exacerbated as the number of dependent formulas in the spreadsheet application increases.

Although specific problems have been addressed in this Background, this disclosure is not intended in any way to be limited to solving those specific problems.

SUMMARY

Embodiments of the present invention generally relate to processing spreadsheet calculations and recalculations with multiple processors, or multiple concurrent threads, when more than one processor or processing engine is available. Further embodiments relate to the use of a tree structure and dependency levels in reordering a chain of entries to perform multithread processing of a recalc operation. Further yet, some embodiments relate to the synchronizing of multithread processing of recalc operations.

As discussed herein, an aspect of a particular embodiment relates to reordering a calculation chain of entries, or "ENTs," so as to create a unified recalc chain comprised of child chains (i.e., dependent formulas and supporting formulas organized in a tree hierarchy) and of ENTs which contain neither dependent nor supporting formulas. An "ENT" refers to a formula contained within a cell of a spreadsheet. In another embodiment, the unified chain is divided into separate dependency levels, in which each dependency level contains ENTs which, aside from those which are dependent upon a supporting formula in a child chain within that dependency level, are dependent only upon ENTs in previous dependency levels. The arrangement in such an embodiment allows the multiple threads to continue processing ENTs throughout a dependency level without having to wait for uncalculated supporting ENTs to be calculated. Once the next dependency level is reached, processing of the ENTs and child chains (if any) located therein is efficiently accomplished based on the calculations already completed in the prior dependency levels.

Further embodiments relate to the use of multiple asynchronous program threads, where a system is comprised of more than one processor or processing engine, to evaluate formulas in this unified recalc chain. In an embodiment, a control thread may be used to control the synchronization of this multithread processing.

This Summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
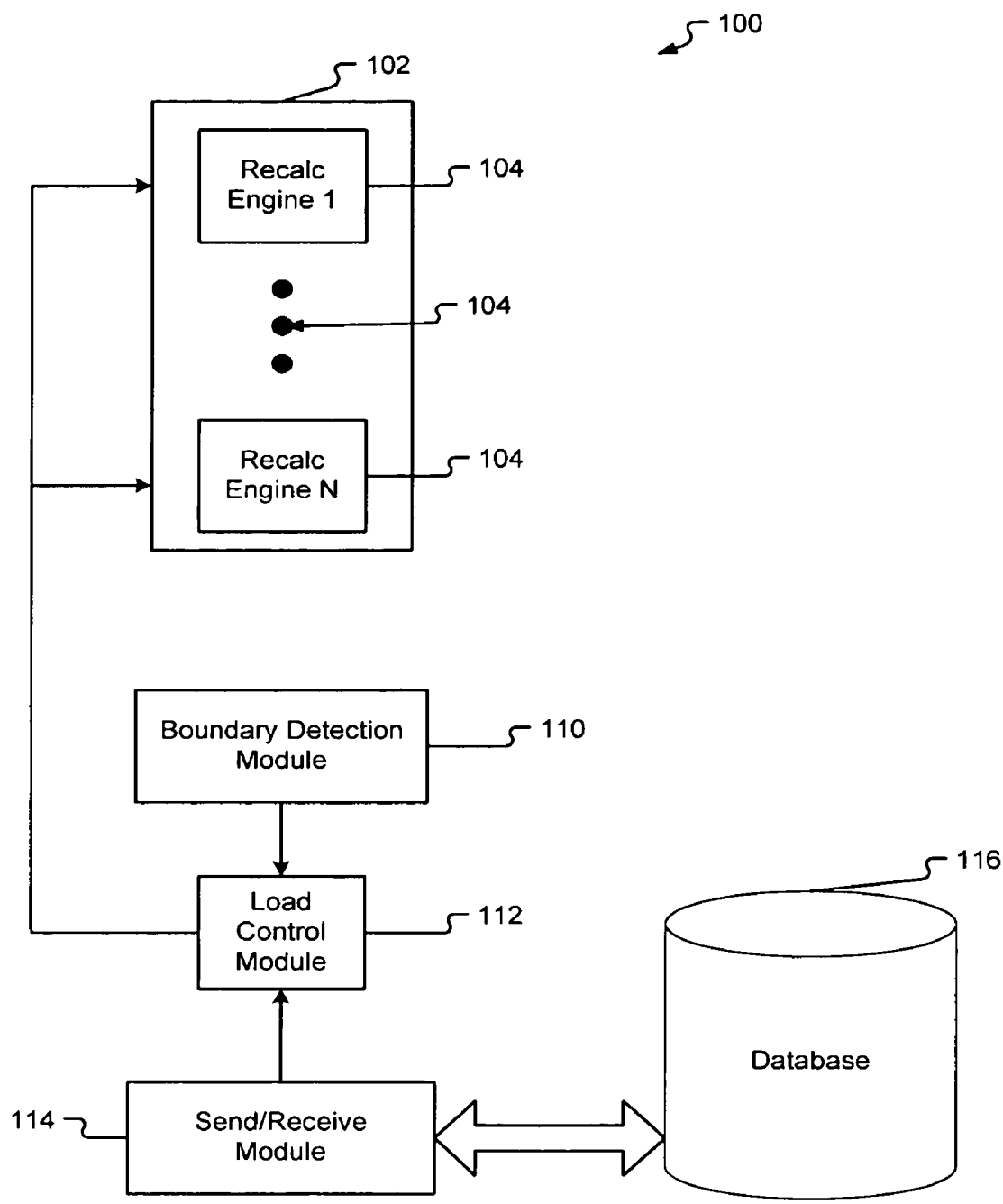
FIG. 1 illustrates a logical representation of exemplary functional component modules including "N" number of recalculation engines ("recalc engines") used in a spreadsheet application in accordance with an embodiment of the present invention.

This disclosure will now more fully describe exemplary embodiments with reference to the accompanying drawings, in which specific embodiments are shown. Other aspects may, however, be embodied in many different forms and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals. Dashed lines may be used to show optional components or operations. Dashed lines may also be used to show logical representations or movement of a cell from one location to another.

An environment 100 for processing spreadsheet recalculations with "N" number of processors and corresponding program threads is shown in FIG. 1. In an embodiment, the system 100 comprises a processing module 102 which includes a number "N" of available processors in the operating system, each having a recalculation engine ("recalc engine") 104 operating thereon. The system 100 further includes a database 116, and an I/O or send/receive module 114 operable to receive and transmit data from the database 106, as well as to communicate with a load control module 112. In turn, the load control module communicates with a boundary detection module 110 that determines the range and domain of "dirty" cells, or those cells which require recalc because they depend upon or support the content changed in another cell. In an embodiment, dirty cells are recalculated in the event a recalculation command is received from the send/receive module 114.

Figure 2:
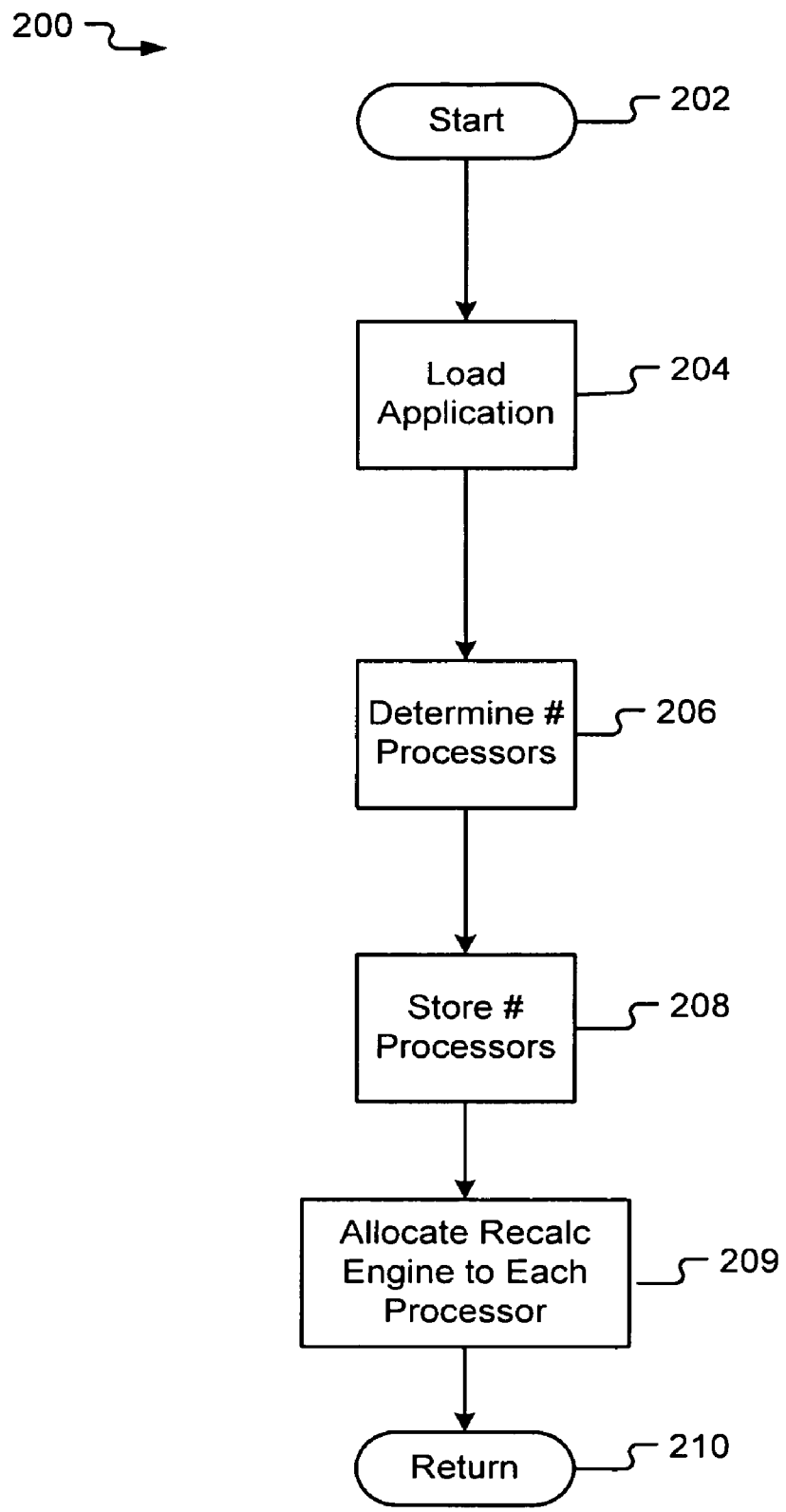
FIG. 2 depicts the basic operations performed by the system shown in FIG. 1 for loading a spreadsheet application and determining the number of processors for use therewith in accordance with an embodiment of the present invention.

In a spreadsheet application using the multi-processor environment of system 100, it is necessary to determine the number of processors available in the operating system. FIG. 2 depicts the basic initialization sequence of operations 200 performed by the system shown in FIG. 1 for loading, or calling, a spreadsheet application and determining the number of processors for use therewith. Start operation 202 is initiated following communication with a load control module 112, in which a spreadsheet application is loaded in load application operation 204. In an embodiment where multiple processors, and thus multiple program threads, are used to evaluate the entries or "ENTs" in a spreadsheet chain calculation, it is necessary to synchronize the evaluation of those ENTs by the plurality of processors. Accordingly, determine operation 206 determines the number of processors, and thus recalc engines 104, in the operating system. Store operation 208 stores the determined number of processors and their access locations in database 116. In an embodiment, the processors used are separate processors, while in another embodiment they are one or more embedded co-processors on a single chip. In turn, a recalc engine is allocated to each processor in allocate operation 209, and then control of process 200 transfers to return operation 210.

Figure 3:
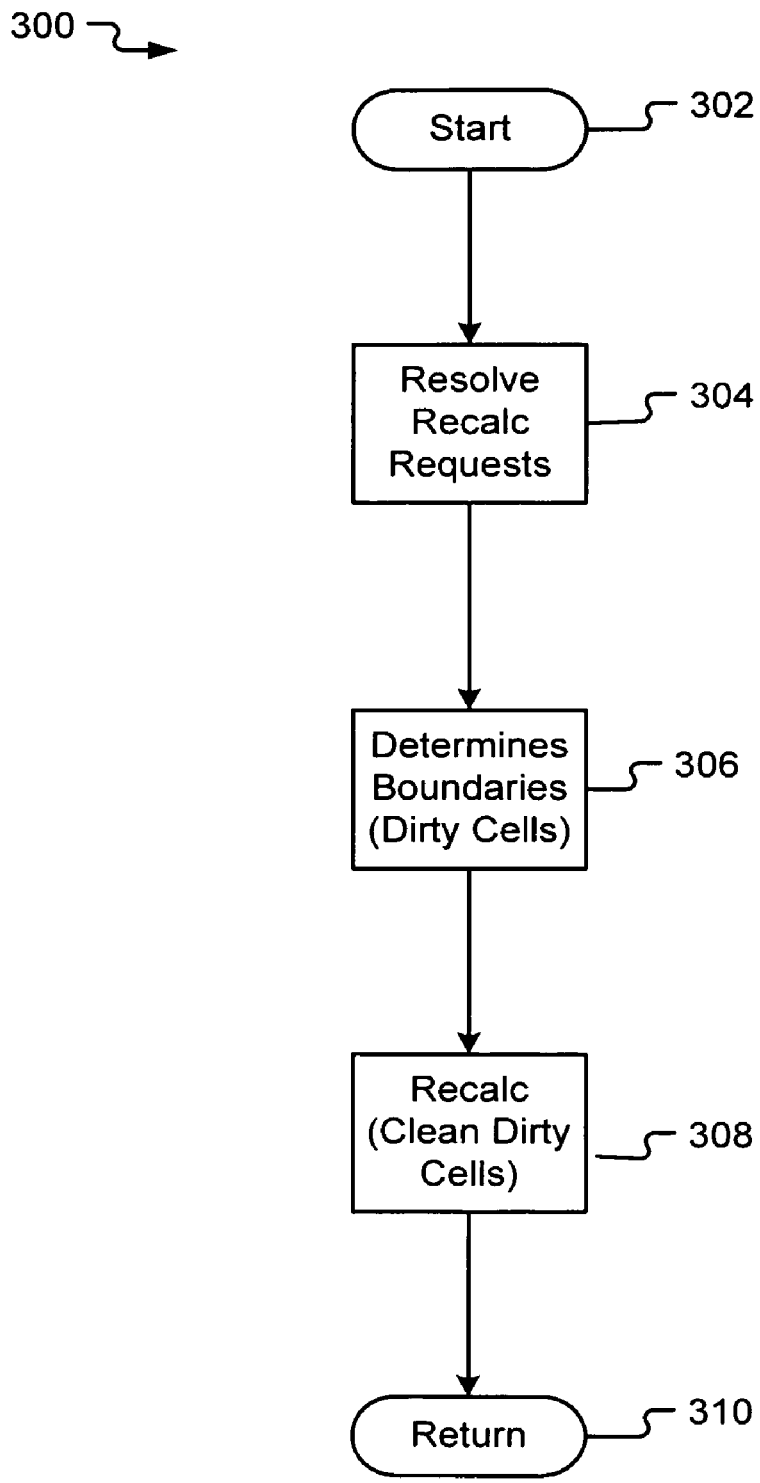
FIG. 3 illustrates the basic operations performed by the system shown in FIG. 1 for performing a recalc operation with the recalc engines depicted in FIG. 1 in accordance with an embodiment of the present invention.

Turning now to FIG. 3, recalc process 300 begins with start operation 302, which is initiated in response to a manual or automatic calculation or recalculation request to process a chain calculation within a spreadsheet running on the system 100 shown in FIG. 1. From start operation 302, the recalculation request is received by the send/receive module 114 and data is retrieved from the database 116 as required by the request. In an embodiment, start operation 302 is triggered by a manual request by a user to recalculate the spreadsheet being displayed. In another embodiment, start operation 302 is triggered automatically by a request from a calling routine or when a user either changes a value or formula in an ENT or adds an additional ENT to the spreadsheet. Regardless of the specific triggering mechanism, the recalculation request is identified or "resolved" in operation 304. Following resolve operation 304, the domain and range of the recalc request is determined in operation 306. In an embodiment, this involves only one ENT. In another embodiment, it involves an array of ENTs that depend upon or support the changed cell content, i.e., "dirty" ENTs. From determine operation 306, process 300 proceeds to recalc operation 308, which recalculates the dirty cells in accordance with embodiments of the present invention. When the recalculation is complete, control transfers to return operation 310, which returns operation to the calling code or user interface.

Figures 4, 5:
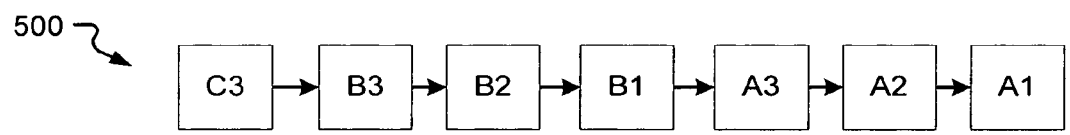
FIG. 4 depicts an exemplary 3×3 spreadsheet showing cell entries with values and/or multiple formulas in a spreadsheet application using the functional component modules illustrated in FIG. 1 in accordance with an embodiment of the present invention.
FIG. 5 illustrates the spreadsheet cells shown in FIG. 4 as initially loaded into a single calculation chain in accordance with an embodiment of the present invention.

FIG. 4 depicts a sample spreadsheet 400 that may be recalculated utilizing the process described above with respect to FIG. 3. In this exemplary representation of a 3×3 spreadsheet, cells A1 and B1 in row 402 are shown with exemplary values of "=1." The cells A2 and B2 in row 404 are shown with formulas=A1 and =B1, respectively, which represent formulas dependent upon A1 and B1. Similarly, the cells A3 and B3 in row 406 are shown with formulas=A2 and =B2, respectively, which represent formulas dependent upon A2 and B2. Finally, cell C3 is shown with a formula of =A3+B3, meaning that is dependent upon A3 and B3. As noted above, the contents of cells A1 through C3 may include values or formulas that must be calculated or recalculated, and thus the content of each cell is referred to as an entry or "ENT." For example, the formula "=A3+B3" is an ENT located in cell C3.

Upon loading, or calling, a spreadsheet 400 with the system 100 shown in FIG. 1, the processors begin by ordering the ENTs into a single calculation chain in consecutive order based on entry into the spreadsheet itself. FIG. 5 illustrates this single calculation chain ordering of cells A1 through C3 of spreadsheet 400 shown in FIG. 4. By way of example only, the ENTs in cells A1 through C3 may have been entered within the spreadsheet 400 in the order of A1, A2, A3, B1, B2, B3, and, finally, C3. In this initial ordering of the ENTs into a single chain, the program code places the first ENT (i.e., A1 in the exemplary embodiment referred to herein) at the rightmost extreme of the calc chain. The next ENTs are added in consecutive order, working from right to left and ending with C3.

In proceeding to evaluate the ENTs in the single calculation chain 500, the calc code starts with C3 and determines that the formula A3+B3 depends upon the formulas in cells A3 and B3. Next, upon looking at cell A3 first (since it is the first named cell in the formula), it is determined that cell A3 is "dirty," or pending calculation. In this embodiment, the ENT "A3+B3" is called a "dependent" formula, and the formula in cell A3 is called a "supporting" formula. In an embodiment of the present invention, the single calculation chain 500 is reordered so as to create a unified chain of dependent and supporting formulas organized in a tree structure utilizing child chains within the unified chain. In an embodiment, a dependent formula, e.g., C3, is determined to be a child of a first supporting formula, e.g., A3. Further, the first supporting formula may be made a child of a second supporting formula upon which it depends.

Once C3 is moved to be a child of A3, the next cell in the single chain is evaluated, namely B3 in the exemplary embodiment shown in FIG. 5. Upon attempting to evaluate B3, the calc code discovers that B3 is dependent upon cell B2, and that B2 is "dirty." B3 thus becomes a child of B2. In similar fashion, the code tries to calculate the next cell, i.e., B2, and determines that B2 depends upon B1. B2 thus becomes a child of B1 and, because B3 is a child of B2, the entire child chain of B1, B2, and B3 (shown as child chain 602 in chain 600 in FIG. 6A) is born. Next, the calc code tries to evaluate A3 and determines that A3 (which has child C3 as discussed above) is dependent upon supporting formula A2, which is itself dependent upon A1. Thus, the child chain A1, A2, A3, and C3 is born. An exemplary representation of this child chain is shown as child chain 604 in FIG. 6A.

Figure 6A:
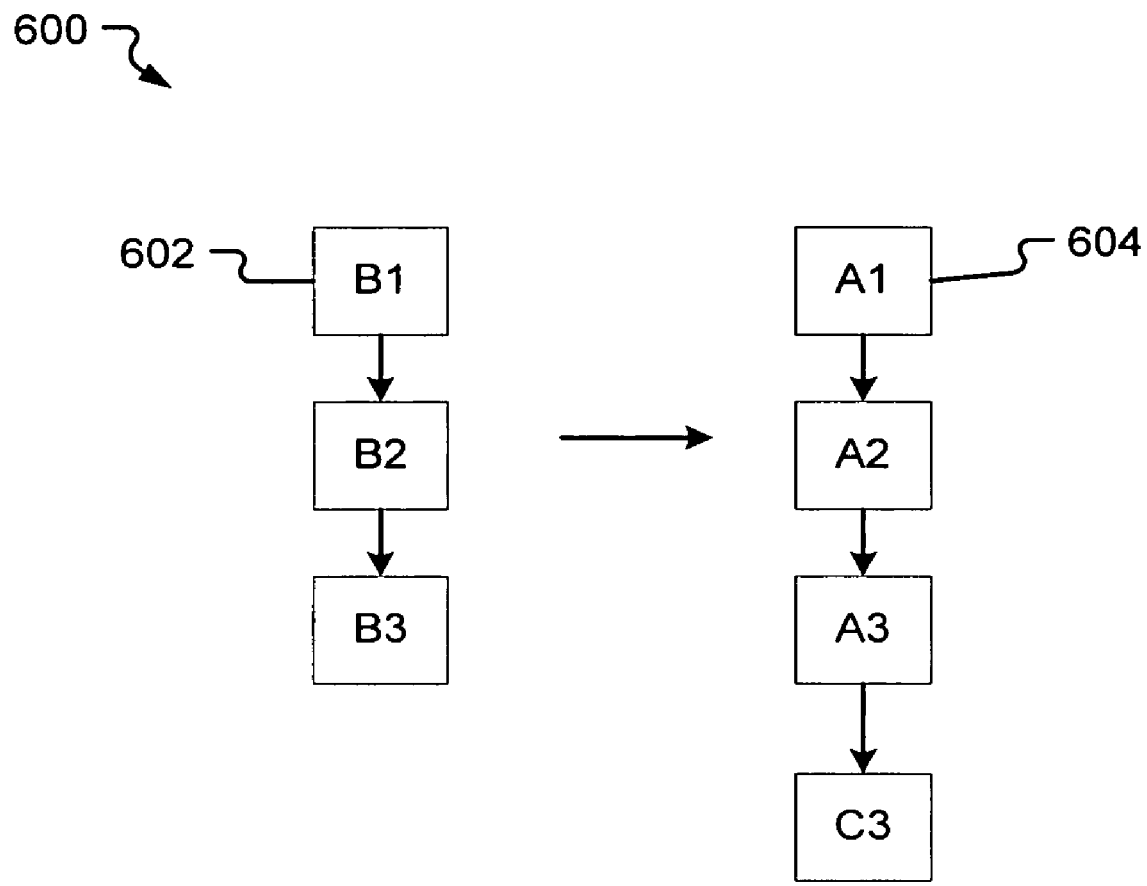
FIG. 6A depicts the cells shown in FIGS. 4 and 5 as reordered into a unified recalc chain of child chains.
Figure 6B:
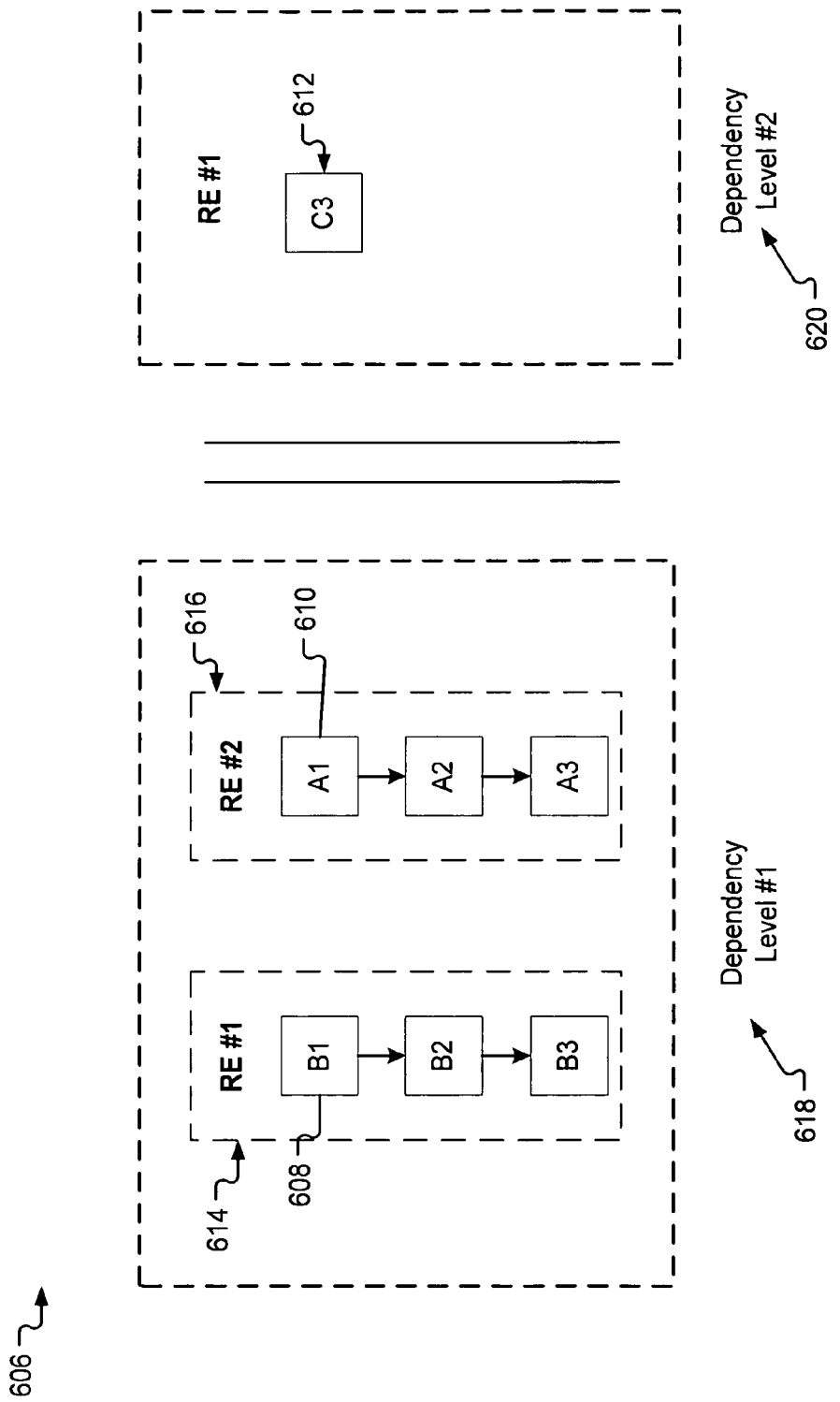
FIG. 6B shows the child chains of FIG. 6A loaded into two recalculation engines and separated into dependency levels, in which one of the cells has been moved to a second dependency level in accordance with an embodiment of the present invention.

While chain 604 shows the child chain of A1, A2, A3, and C3, another exemplary embodiment of this invention depicted in FIG. 6B shows a similar child chain 610 having C3 removed therefrom, wherein C3 is included in its own chain 612 located in a separate "dependency level" 620 in accordance with another embodiment of the invention. Indeed, FIG. 6B shows two discrete dependency levels, namely dependency level #1 (618) and dependency level #2 (620). Each dependency level contains ENTs which, aside from those which are dependent upon a supporting formula in a child chain within that dependency level, are dependent only upon ENTs in previous dependency levels. The arrangement in such an embodiment allows for one or more processors to process ENTs throughout a dependency level in a continuous fashion without having to wait for uncalculated supporting ENTs to be calculated.

The benefits of separate dependency levels can be demonstrated in the exemplary embodiment of calculation chain 600, wherein C3 is a child of A3, which in turn is a child of A2 and A1. As shown in FIG. 400, C3 is dependent upon the sum of the formulas in A3 and B3. C3 is thus dependent upon both A3 and B3. If B3 is calculated before the calc code tries to evaluate C3 in child chain 604, then there will be no delay when the calc code reaches C3 (i.e., the calc code is able to immediately calculate C3 because both A3 and B3 will already have been calculated). Thus, C3 in such an embodiment may remain as part of the child chain 604. However, where B3 is not calculated before C3 is evaluated by the calc code, the calc code will not be able to calculate C3. Consequently, C3 remains uncalculated as long as B3 remains uncalculated. Thus, the processing of the child chain 604 would be paused, or stalled, based on C3's dependency on B3. Such dependencies have the potential to create inefficiencies in the processing of recalcs. An embodiment thus provides for C3 (612) to be moved from dependency level #1 (618) to dependency level #2 (620), as shown in the unified calc chain 606 in FIG. 6B.

In an embodiment where multiple processors are available, moving C3 to a new dependency level allows a second processor working on child chain 610 to complete that chain's processing and move to the processing of another ENT or child chain within dependency level #1 while a first processor continues the processing of child chain 608. These multiple processors are shown as recalc engines #1 and #2 (614 and 616, respectively) in FIG. 6B since each processor includes a recalc engine operating thereon. While two recalc engines are shown in FIG. 6B in accordance with an embodiment of the present invention, any number "N" of processors, as shown by the ellipses 104 in FIG. 1, may be employed for the calculation and recalc operations.

Figure 6C:
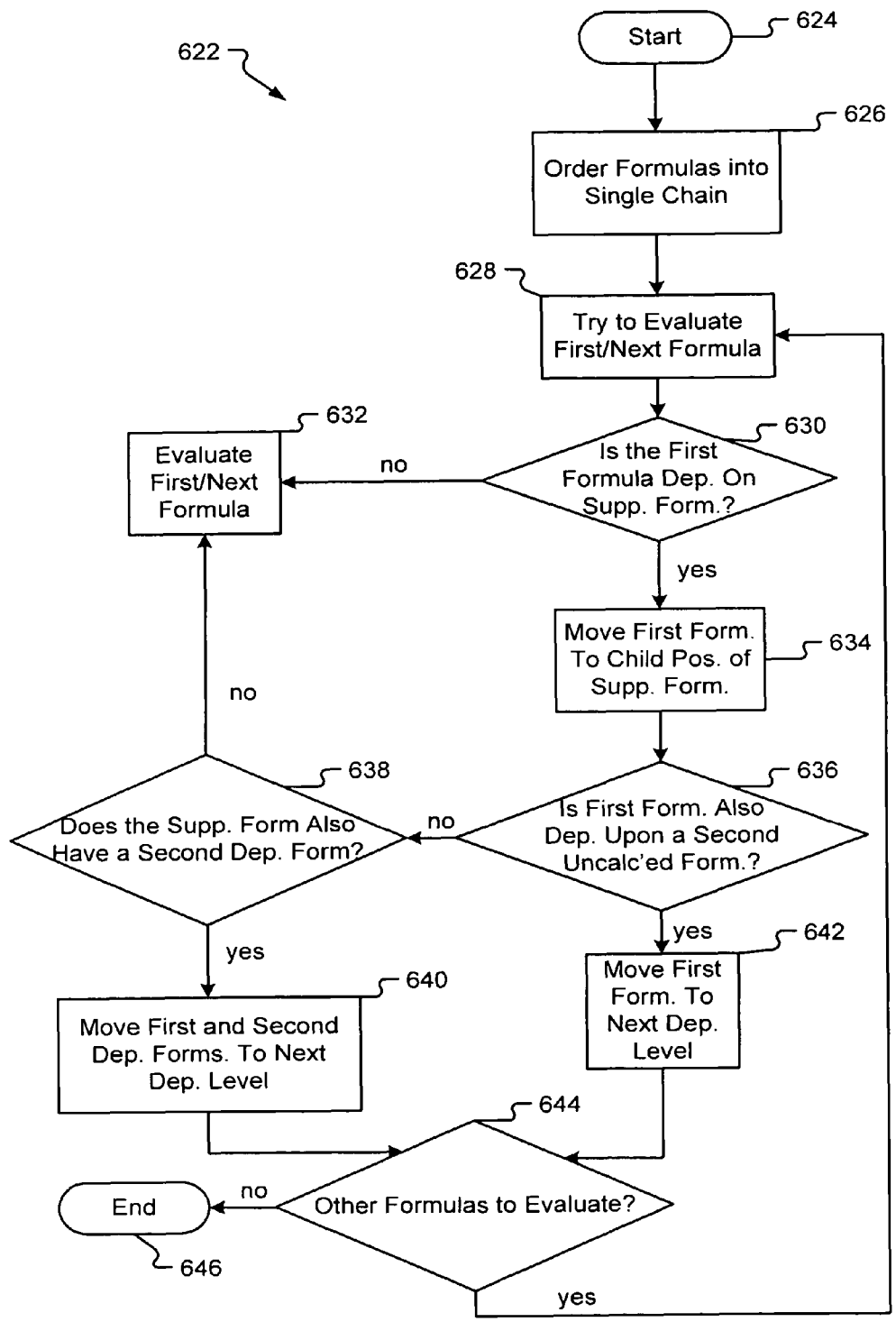
FIG. 6C is a flow diagram illustrating the operational characteristics of a process for reordering the cells into child chains and dependency levels as depicted in the exemplary embodiments of FIGS. 6A and 6B and in accordance with other embodiments of the present invention.

FIG. 6C illustrates the process 622 for performing the reordering of ENTs and their movement, if any, to the next dependency level in accordance with an embodiment of the present invention. Start operation 624 is initiated in response to a loading of cells into a spreadsheet program 400 and a call for recalculation. From start operation 624, process 622 proceeds to order operation 626, in which the ENTs are ordered into a single calculation chain based on their order of entry into spreadsheet program 400, as discussed above. Next, evaluate operation 628 attempts to evaluate the first formula in the single calculation chain. After trying to evaluate the first formula, process 622 proceeds to query operation 630 which determines whether the first formula is dependent upon a supporting formula. If the first formula is dependent upon a supporting formula, flow branches YES to move operation 634, which moves the first dependent formula to the child position of the supporting formula. If the first formula is not dependent upon a supporting formula, flow branches NO to evaluate operation 632 and the first formula is evaluated.

From move operation 634, process 622 proceeds to query operation 636 which determines if the first formula is also dependent upon a second, uncalculated formula. If query operation 636 determines that the first formula is dependent upon a second uncalculated formula, flow branches YES to move operation 642, which moves the first dependent formula to the next dependency level. Next, query operation 644 determines whether there are any other formulas to evaluate in the calculation chain and, if so, branches YES to evaluate operation 628. If query operation 644 determines that there are no other formulas to evaluate, flow branches NO to terminate operation 646 which ends process 622. If query operation 636 determines that the first dependent formula is not dependent upon a second uncalculated supporting formula, flow branches NO to query operation 638 which determines whether the first supporting formula also has a second dependent formula. If query operation determines that the first supporting formula does not have a second dependent formula, flow branches NO to evaluate operation 632. On the other hand, if query operation 638 determines that the first supporting formula also has a second dependent formula, flow branches YES to move operation 640, in which the first and second dependent formulas are moved to the next dependency level. From move operation 640, process 622 proceeds to query operation 644 to determine if any other formulas require evaluation, and the process proceeds as discussed above.

Figure 7:
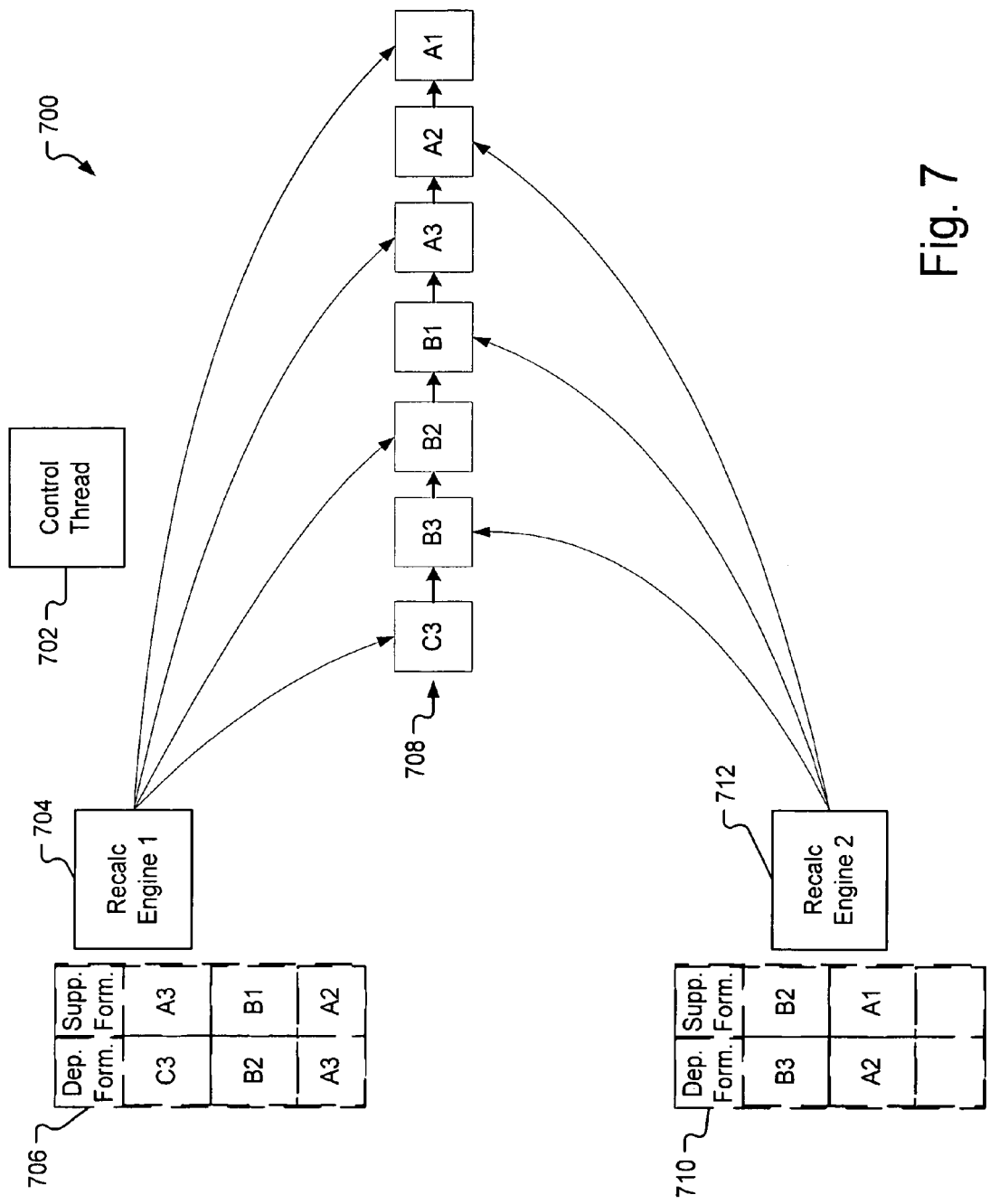
FIG. 7 illustrates the processing of the cells shown in FIG. 4 by the two separate recalc engines, as well as a queue of cells to be reordered for each of the recalc engines in accordance with an embodiment of the present invention.

While the reordering of the ENTs discussed in FIGS. 6A, 6B, and 6C has related to such reordering generally without regard to the number of processors (i.e., using one or more processors), FIG. 7 specifically illustrates the reordering 700 of a single calculation chain from spreadsheet 400 through the use of multiple recalc engines and asynchronous threads. A control thread 702 is employed to synchronize the various threads and recalc engines. In the exemplary embodiment of system 700, two recalc engines 704 and 712 are employed; however, other embodiments may involve any number of recalc engines and corresponding multi-thread processing operations.

In accordance with the exemplary embodiment depicted in FIG. 7, a processing thread from recalc engine 1 (704) attempts to evaluate C3 in the single calculation chain 708. Because C3 is dependent upon A3 and B3, which are not yet calculated, C3 may not yet be calculated. Consequently, recalc engine 1 moves C3 to its queue 706 of dependent and supporting formulas. C3 is listed as a dependent formula, and A3 is listed as the supporting formula for C3. Next, the program thread of recalc engine 2 (712) attempts to evaluate B3. Unable to evaluate this dependent formula, recalc engine 2 moves dependent B3 and its supporting formula B2 to its own queue 710 of dependent and supporting formulas. This process continues until the recalc engines have attempted to evaluate each ENT in the single calculation chain 708.

Figure 8:
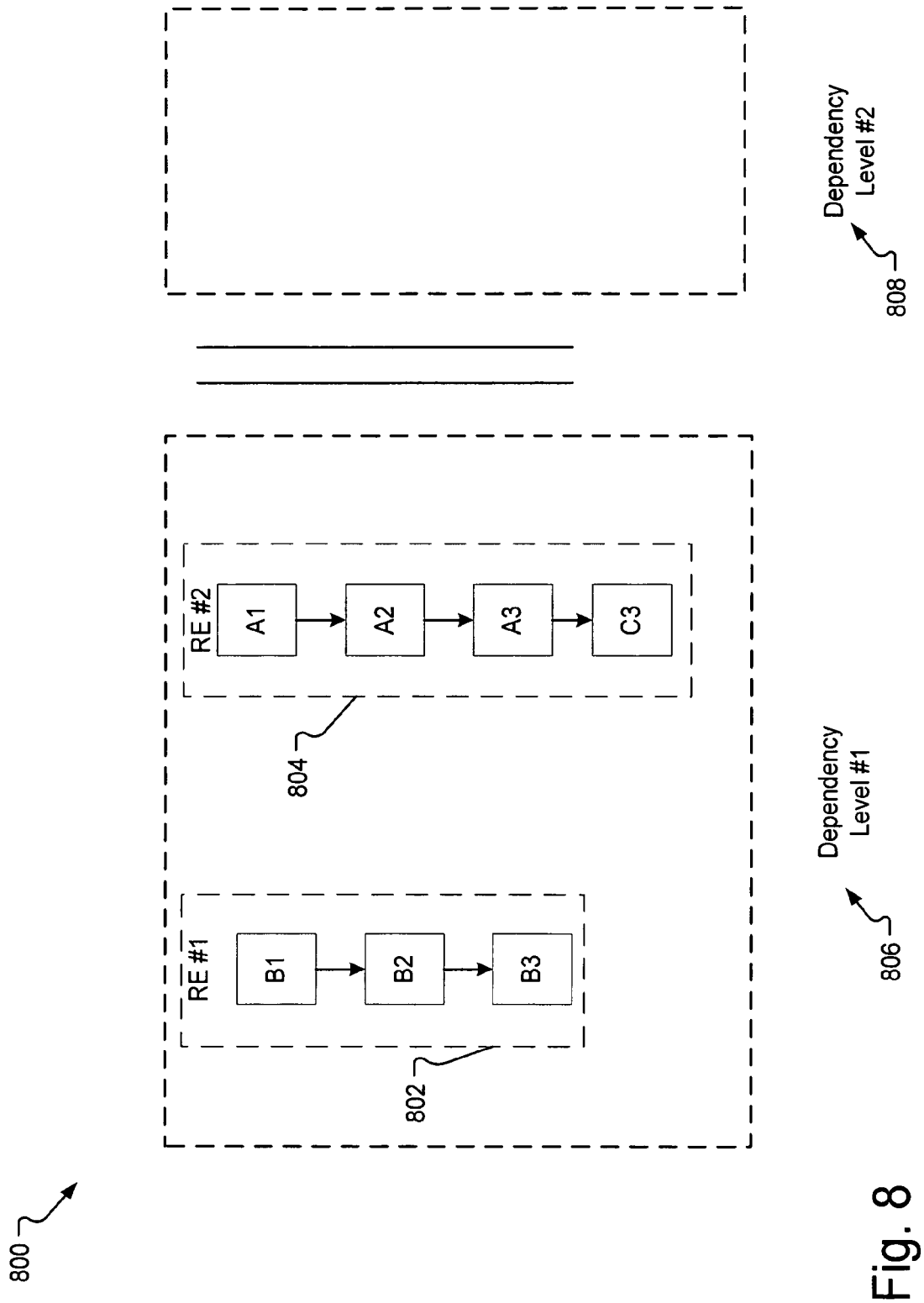
FIG. 8 depicts a representation of a non-optimal reordering of the cells queued in FIG. 7 in accordance with an embodiment of the present invention.

Once each ENT in chain 708 has been evaluated, or attempted to be evaluated, the queues 706 and 710 are reordered into child chains by the control thread 702 based on their dependent/supporting relationships. Similar to child chain 604 discussed above, FIG. 8 shows child chain 804 with ENTS A1, A2, A3, and C3. Child chain 802 shows ENTs B1, B2, and B3. These child chains are both initially shown as being located in dependency level #1 (806) of FIG. 8. In an embodiment, recalc engine 1 (704) processes child chain 802 comprised of B1, B2, and B3. Then, while recalc engine 1 begins processing child chain 802, recalc engine 2 begins processing child chain 804. In this exemplary embodiment, it is assumed that recalc engine 1 finishes processing B3 in child chain 802 before recalc engine 2 reaches C3 of child chain 804. In such a case, C3 may be evaluated because both the supporting formulas A3 and B3 have already been calculated. In this embodiment, C3 is shown as being located in dependency level #1 (806), and dependency level #2 (808) is shown as empty in FIG. 8. However, in another embodiment, it is possible (for a multitude of reasons) that recalc engine 1 is not able to evaluate B3 before recalc engine 2 attempts to evaluate C3. In such a case, C3 would remain uncalculated and recalc engine 2 would remain stalled while waiting for recalc engine 1 to finish its processing of B3. Such stalling prevents recalc engine 2 from processing other ENTs and child chains which could exist within the first dependency level (though such additional chains are not shown in the exemplary embodiment of FIG. 8). A stalled recalc engine is an inefficient use of the multi-threaded processing capabilities of a multi-processor system (i.e., where the requested recalc operations for recalc engine 2 are dependent upon the processing speed of single recalc engine 1). Thus, the embodiment shown in FIG. 8 is not an optimal reordering of the cells. To the contrary, an optimal reordering would appear as the exemplary embodiment shown in FIG. 6B and discussed above in reference thereto.

While FIG. 8 shows a non-optimal reordering 800 of the ENTs, in which C3 remains in dependency level #1 (806), other embodiments (where B3 remains uncalculated at the time of evaluating C3) would require C3 to be moved to dependency level #2 (808). In one embodiment, the rules governing the movement of an ENT to the next dependency level are:

(1) Try to make the dependent formula a child of the supporting formula.

(2) If the dependent formula is already a child of another formula, then the dependent formula is queued for the next dependency level; or If the supporting formula upon which the dependent formula depends already has a child, then the dependent formulas are queued for the next dependency level.

(3) If a formula contains a function which must be evaluated on the control thread, then the formula (referred to as a "control thread formula") is moved to the next dependency level. By way of example only, the following functions must be evaluated on the control thread:

(a) INDIRECT function;
(b) GETPIVOTDATA function;
(c) INFO function;
(d) ADDRESS function;
(e) User-Defined Functions (UDFs).

Figure 9:
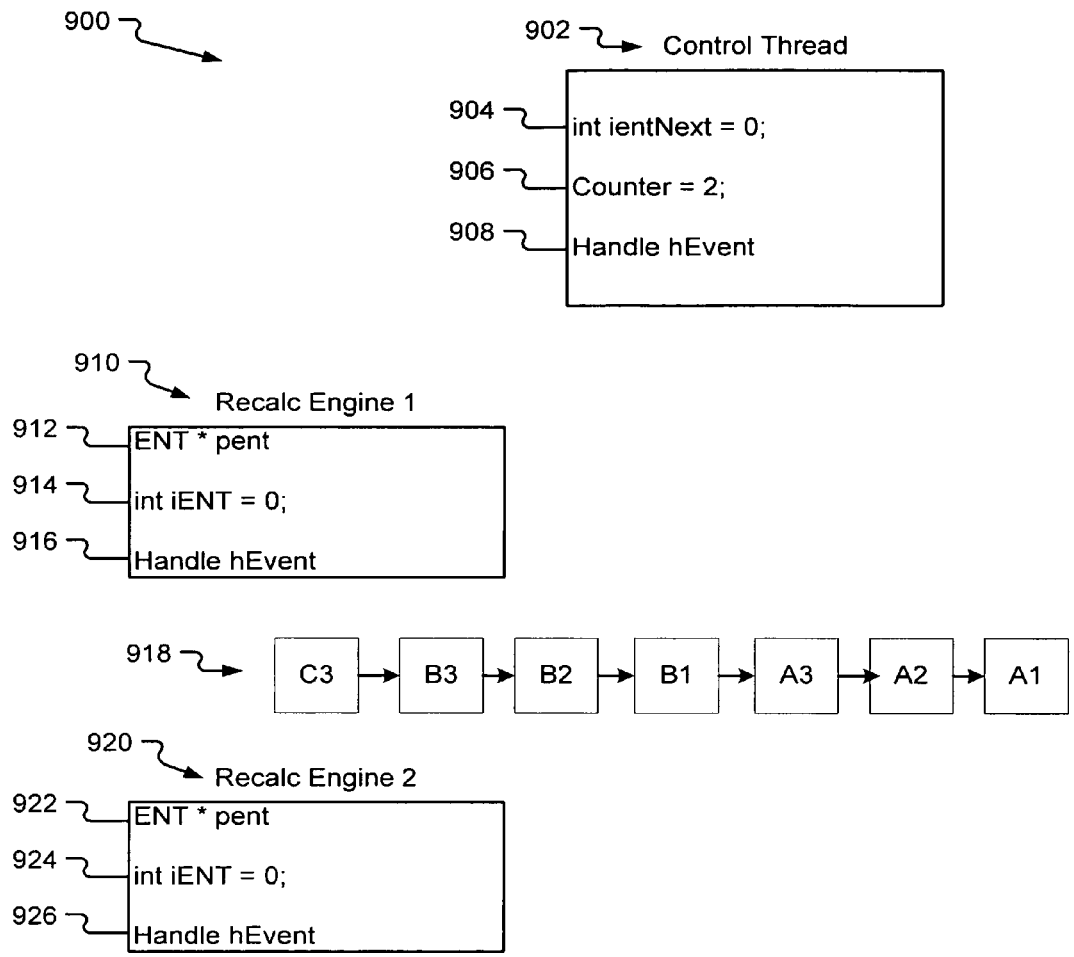
FIG. 9 illustrates the program code for synchronizing the threads of the recalc engines shown in FIG. 7 in accordance with an embodiment of the present invention.

Turning now to FIG. 9, an exemplary embodiment of the program code 900 for triggering and suspending the asynchronous threads of recalc engines 1 and 2 shown in FIG. 7 is shown in accordance with an embodiment of the present invention. Control Thread 902 controls the triggering of the asynchronous threads. Initially, counter 906 is set to the number of processors determined from determine operation 206. Counter 906 may be any type of counter. In an exemplary embodiment, counter 906 may be referred to as ISpinning. Regardless of the term or type of counter used, counter 906 in control thread ("CT") 902 is set to the number of processors determined to be available for multi-thread processing. In the exemplary embodiment of FIG. 9, counter 906 is thus set to a value of "2" for recalc engines 910 and 920. Further, the control thread index 904, e.g., int ientNext, is set to zero ("0"), and each recalc engine index 914 and 924, int iENT, is set to "0." These indices control the pointers for the ENTs 912 and 922, as described below. An index value of "0" is an index to the first cell, i.e., C3, on the left of single calculation chain 918.

Figure 10A:
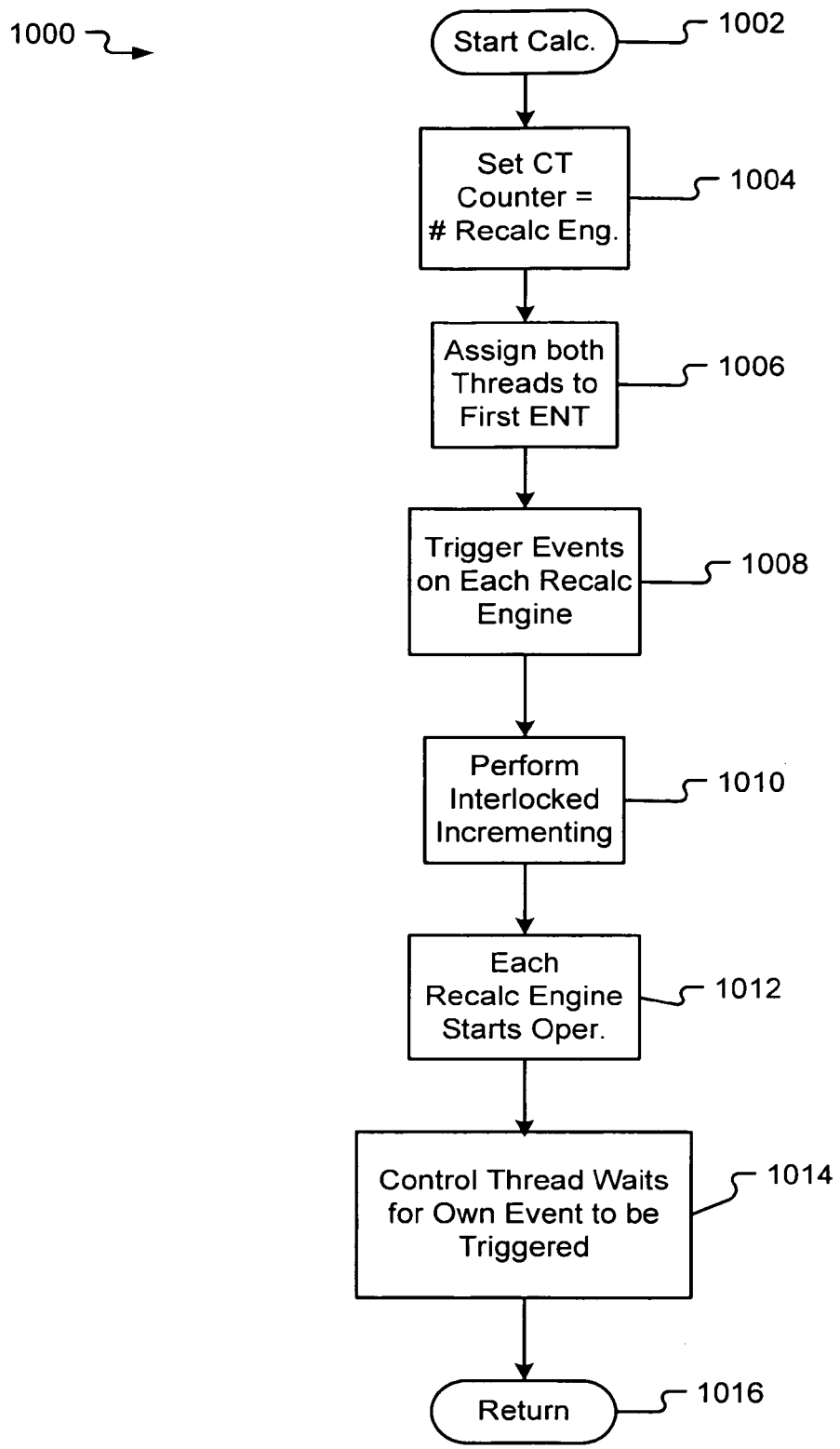
FIG. 10A is a flow diagram illustrating the operational characteristics of a process for initiating the evaluating of the values and formulas in the cells shown in FIG. 2 in accordance with an embodiment of the present invention.
Figure 10B:
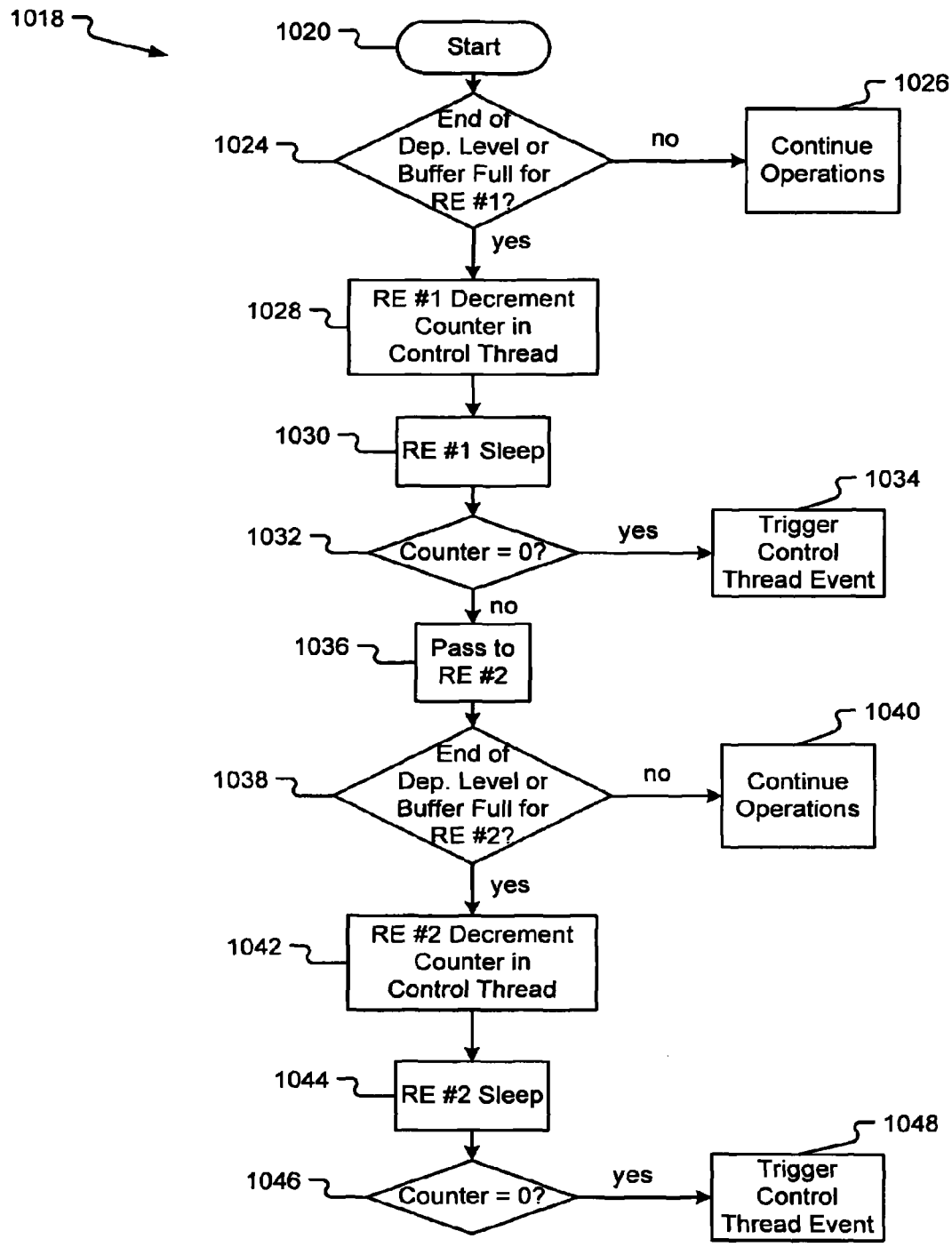
FIG. 10B is a flow diagram illustrating the operational characteristics of a process for suspending or triggering the control thread and/or asynchronous threads of the recalc engines shown in FIG. 7 in accordance with an embodiment of the present invention.

FIGS. 10A and 10B illustrate the operational steps 1000 of triggering and suspending the asynchronous thread operations of recalc engines 1 (910) and 2 (920) to evaluate single calculation chain 918. Start calculation operation 1002 of FIG. 10A is initiated in response to a loading, or call, to evaluate a spreadsheet such as the spreadsheet 400 shown in FIG. 4. The counter 906 is set to the number of recalc engines in set operation 1004. Next at assign operation 1006, the control thread 902 sets the indices, 914 and 924, of recalc engine 1 and 2, respectively, to "0" so that each thread is assigned to start evaluating at the first ENT. The control thread 902 then triggers the events 916 and 926 on each recalc engine to wake the threads for processing in trigger operation 1008. A call, or loading of an application, is an example of an event where the control thread 902 may trigger a recalc engine event. Upon being triggered, each recalc engine performs a thread-safe interlocked increment operation 1010. For example, recalc engine 910 begins this interlocked increment operation 1010 by adding a "1" to the control thread index 904 and receiving the previous value of index 904, i.e., "0" in this embodiment, in return from control thread 902. The difference between the first recalc engine's index value 914 and the value of the control thread index 904 returned from control thread 902 is the value which recalc engine 1 should iterate down the single calculation chain 918. In this exemplary embodiment, recalc engine 1 (910) increments the control thread index 904 from a value of "0" to a value of "1." Because "0" was the previous value of the control thread index 904, recalc engine 1 (910) receives the value "0," compares it to the value of its own index 914, e.g., "0" in accordance with this exemplary embodiment, to determine the difference between these two values, i.e., "0" minus "0" equals "0", and receives a value of "0." A value of "0" requires recalc engine 1 (910) to evaluate the first ENT (i.e., C3) of the calculation chain 918.

Similarly, recalc engine 2 (920) performs a thread-safe interlocked increment operation, in which it increments the control thread index 904 from "1" to "2" and receives the previous value of the control thread index 904 in return, i.e., "1" in this exemplary embodiment. Recalc engine 2 (920) then compares this returned value of "1" from the control thread index 904 with the value of its own index, i.e., "0" in this exemplary embodiment, and computes a difference between these two values of "1." A value of "1" thus requires recalc engine 2 (920) to evaluate the second ENT (i.e., B3) of calculation chain 918.

In an embodiment, this thread-safe interlocked incrementing continues until the end of the dependency chain. Upon performing interlocked incrementing operation 1010, each recalc engine starts evaluation of an assigned ENT in operation 1012. Having triggered the asynchronous threads to evaluate the chain 918, the control thread 902 suspends its own operations at step 1014 and waits for its own event 908 to be triggered. Process 1000 then transfers to return operation 1016.

In an embodiment, the operations of a recalc engine may be suspended individually by the recalc engine itself. In another embodiment, a recalc engine may require that all asynchronous threads be suspended. In a first embodiment, an asynchronous thread suspends itself when the end of a dependency level is reached. In another embodiment, an asynchronous thread may be suspended when that thread's queue, or buffer, becomes full with dependent and supporting formulas. Other embodiments may involve other reasons for suspending an asynchronous thread. The examples given herein are intended to serve as exemplary embodiments only. In a further embodiment, an asynchronous thread may require that all threads be paused (e.g., where a control thread formula is detected by the asynchronous thread).

Following the triggering of the thread operations described in FIG. 10A above, a "suspend" process 1018 for suspending, or pausing, individual asynchronous thread operations is described in FIG. 10B in accordance with an exemplary embodiment. In accordance with an embodiment of the present invention, the flowchart depicted in FIG. 10B shows the passing off of operations between the two threads. In another embodiment, the threads may operate simultaneously. The flowchart depicted in FIG. 10B is intended to serve as an exemplary embodiment only and in no way should be construed as limiting the operations of the threads. Turning to FIG. 10B, as discussed above, a thread may suspend its operations if it detects that it has reached the end of a dependency level. In another embodiment, the thread may pause its operations if it detects that its queue, or buffer, is full. Thus, from start operation 1020, flow proceeds to query operation 1024 which determines whether an end of a dependency level has been reached, or whether the buffer for recalc engine #1 is full. If query operation 1024 determines that an end of a dependency level has not been reached and that the queue for that thread is not full, flow passes NO to continue operation 1026, in which the thread continues to evaluate ENTs and iterate down the calculation chain. On the other hand, if query operation 1024 determines either that an end of a dependency level has been reached or that the buffer for that thread is full, flow passes YES to decrement counter operation 1028. Decrement counter operation decrements the counter 906 of the control thread. In suspending its own operations, a recalc engine will, among other functions, decrement the counter of control thread 906. If the counter 906 has a value greater than "0," a thread must be operating, or still awake. However, when the value of the counter is "0," all threads are suspended and event 908 of control thread 902 is triggered. Upon decrementing the control thread counter 906, recalc engine #1 is suspended in sleep operation 1030, or, in other words, put into sleep mode. Next, query operation 1032 determines whether the control thread counter 906 is equal to "0." If the counter 906 has a value of "0," flow branches YES to trigger control thread event operation 908 at operation 1034 because a value of "0" indicates that all asynchronous threads are suspended. If the counter 906 does not have a value of "0," flow branches NO to pass operation 1036, in which control is passed to recalc engine #2. Recalc Engine #2 proceeds through steps 1038 through 1048, which are analogous to those discussed above for recalc engine #1.

Figure 11:
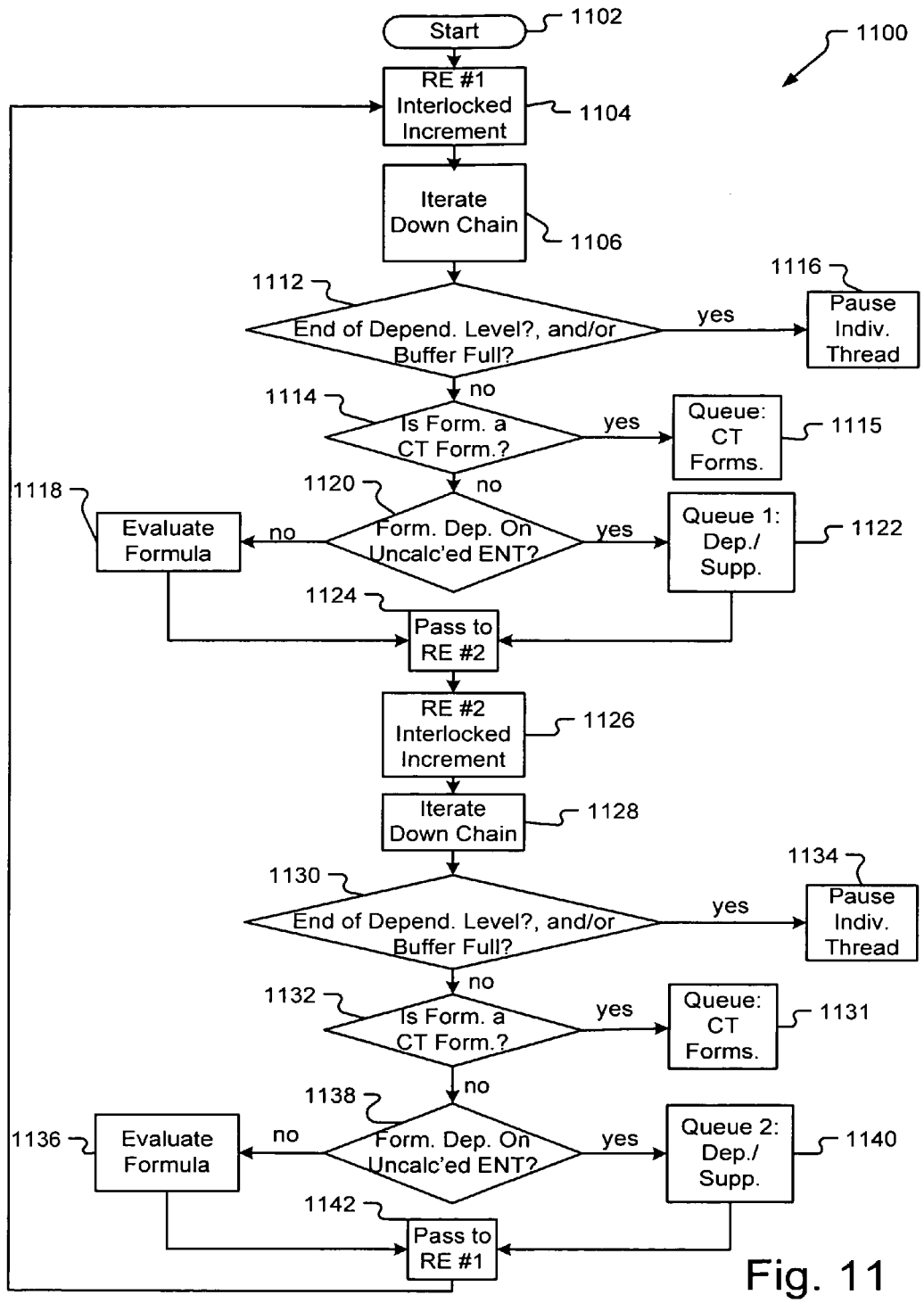
FIG. 11 is a flow diagram illustrating the operational characteristics of a process for reordering the cells with the control thread and asynchronous threads of the recalc engines shown in FIG. 7 in accordance with an embodiment of the present invention.

A process 1100 for iterating through a calculation chain to determine necessary reordering and to detect control thread formulas, if any, is shown in accordance with an embodiment of the present disclosure. As discussed above, the exemplary embodiment of the present invention shown in FIG. 11 depicts the passing off of operations between the two threads. In another embodiment, the threads may operate simultaneously. The flowchart depicted in FIG. 11 is intended to serve as an exemplary embodiment only and in no way should be construed as limiting the operations of the threads. Turning to FIG. 11, start operation 1102 is initiated following the triggering of events 1008 of each recalc engine. From the start operation 1102, the operation flow proceeds to the interlocked increment operation 1104 of recalc engine #1. Next, recalc engine #1 iterates down the calculation chain in iterate operation 1106 to the calculated ENT value assigned through the thread-safe increment operation 1104. Upon reaching the assigned ENT, the flow passes to query operation 1112 which determines whether the end of the dependency level has been reached, or whether the asynchronous thread's queue (or buffer) is full. If the end of the dependency level is detected, or if the asynchronous thread's queue is determined to be full, the asynchronous thread pauses its own operations in pause operation 1116. If none of these items requiring pausing is present, the process 1100 proceeds to query operation 1114 which determines whether the formula is a control thread formula. If a control thread formula is detected, flow branches YES to queue operation 1115 which queues the control thread formula into a separate buffer, or queue, consisting only of such formulas. If query operation 1114 determines that the formula is not a control thread formula, then flow branches NO to query operation 1120 which determines whether the formula in the assigned ENT is dependent upon an uncalculated ENT. If the query operation 1120 determines that the formula is dependent upon an uncalculated ENT, flow branches YES to queue 1 in operation 1122, wherein the dependent and supporting formulas are placed in the proper queue. If query operation 1120 determines that the formula is not dependent on an uncalculated ENT, flow branches NO to evaluate the formula at operation 1118 which returns a value.

Following evaluate and queue operations 1118 and/or 1122, process 1100 proceeds to operation 1124, in which the operations are passed to recalc engine #2. The second recalc engine performs steps 1126 through 1142, which are analogous to those discussed above in reference to recalc engine #1 operations 1104 through 1124.

Figure 12:
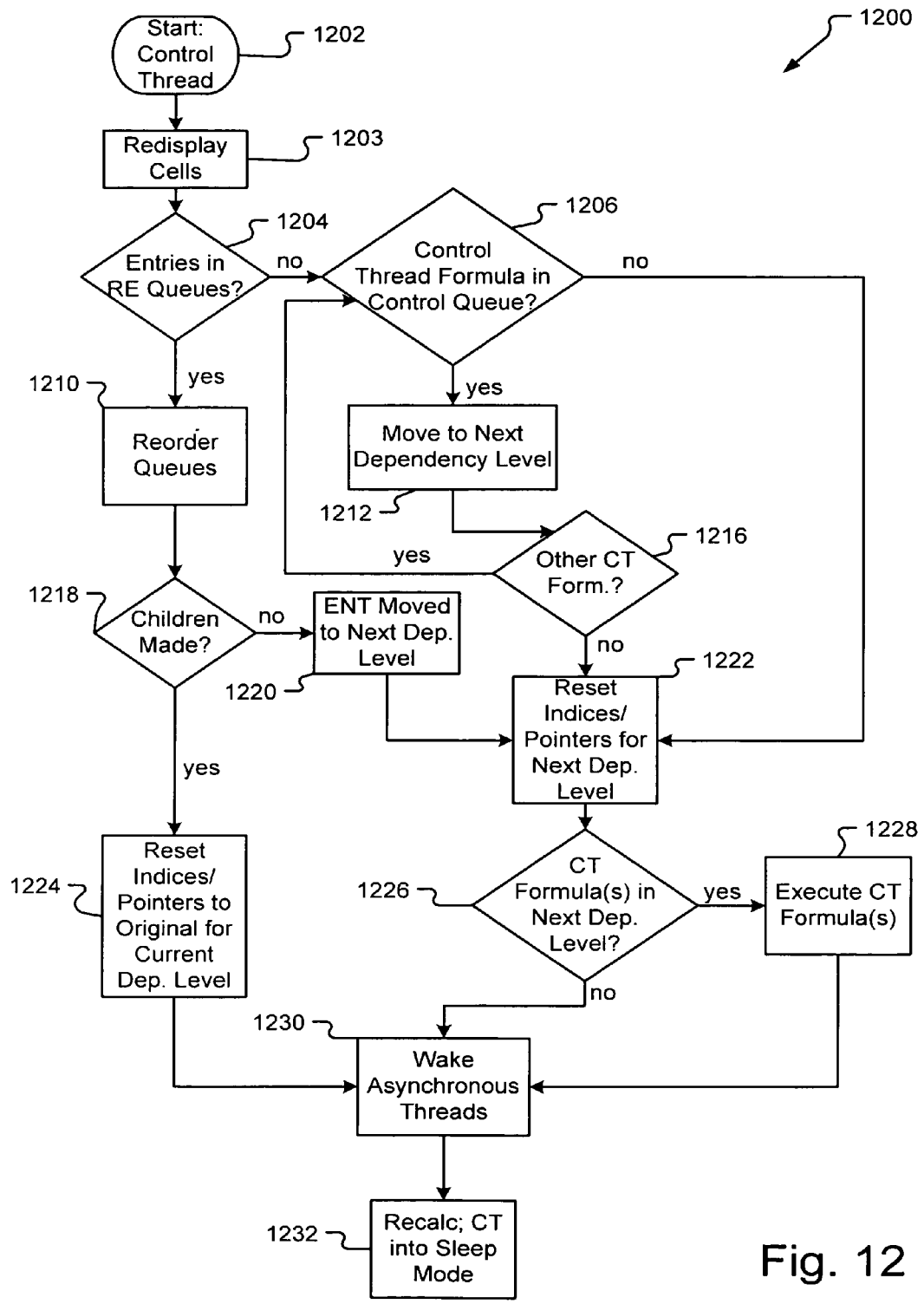
FIG. 12 is a flow diagram illustrating the operational characteristics of a process for allowing the control thread to reorder the cells of the queues shown in FIG. 7, to work on control-thread-only formulas, and to redisplay cells in accordance with an embodiment of the present invention.

Turning now to FIG. 12, process 1200 involving control thread operations for reordering the calculation chain into a unified, reordered chain is shown in accordance with an embodiment of the present invention. Start operation 1202 is initiated in response to a trigger of the control thread event.

From start operation 1202, the flow proceeds to redisplay operation 1203, which redisplays the cells of the spreadsheet 400. Following redisplay operation 1203, process 1200 proceeds to query operation 1204 which determines whether there are any entries in the queues of the recalc engines. If query operation 1204 determines that such entries do exist, flow branches YES to reorder operation 1210. Reorder operation 1210 reorders the dependent and supporting formulas into child chains within a unified chain. Once this reordering is completed, query operation 1218 determines whether any children were made. If children were made, it is necessary for the recalc operation to again run through the dependency level containing those new children chains. Thus, if a child or children were made, flow branches YES to reset operation 1224, which resets the indices and pointers of the recalc engines so as to start the beginning of that dependency level again. From there, process 1200 proceeds to wake operation 1230, which triggers the events of the asynchronous threads. These threads perform recalc operations on the reordered chain. Upon triggering the recalc engines, the control thread suspends its own operations in sleep operation 1232.

If query operation 1218 determines that no children were made in the reordering, the entry or entries in the queues must have been moved to the next dependency level as represented by operation 1220. If no children were made, it is not necessary to recalc the ENTs within the current dependency level. Instead, the indices and pointers of the asynchronous threads, as well as the control index of the asynchronous thread, are reset in reset operation 1222 for the next dependency level. Flow then proceeds to query operation 1226 to determine whether there are any control thread formulas in the next dependency level. If query operation 1226 determines that there are control thread formulas in the next dependency level, flow branches YES to execute operation 1228, which allows the control thread to work on those formula (s). Once those formulas are evaluated, flow proceeds to wake asynchronous threads operation 1230, which triggers the events of the asynchronous threads and the steps 1230 and 1232 are processed as discussed above. If query operation 1226 determines that there are no such formulas, flow branches NO to wake operation 1230, and process 1200 proceeds through steps 1230 and 1232 as discussed above.

If query operation 1204 determines that there are no entries in the recalc queues, flow branches NO to query operation 1206, which determines whether there is a control thread formula in the linked list of the control thread 902. As discussed above, a control thread formula is a formula that must be evaluated by the control thread, as opposed to by one of the asynchronous threads. If a control thread formula has been queued, flow branches YES to move operation 1212, in which the control thread formula is moved to the next dependency level in the unified chain. By moving control thread formulas to a new dependency level immediately following the current dependency level, multi-thread processing may continue despite the need to evaluate a control thread formula. From move operation 1212, flow proceeds to query operation 1216 which determines whether there are any other control thread formulas. If there are other queued control thread formulas, flow branches YES to query operation 1206 and the above steps are repeated. If query operation 1216 determines that there are no other control thread formulas, flow branches NO to reset operation 1222, which resets the indices and pointers of the asynchronous threads (and the corresponding control index of the control thread) to the next dependency level.

Before the control thread suspends its operations, it first determines whether there are any control thread formulas in the next dependency level in query operation 1226, and process 1200 then proceeds through steps 1226 through 1232 as discussed above.

If query operation 1206 determines that there are no control thread formulas, flow branches NO to reset operation 1222, which resets the indices and pointers for the next dependency level, and process 1200 proceeds through steps 1222 through 1232 as discussed above.

Figure 13:
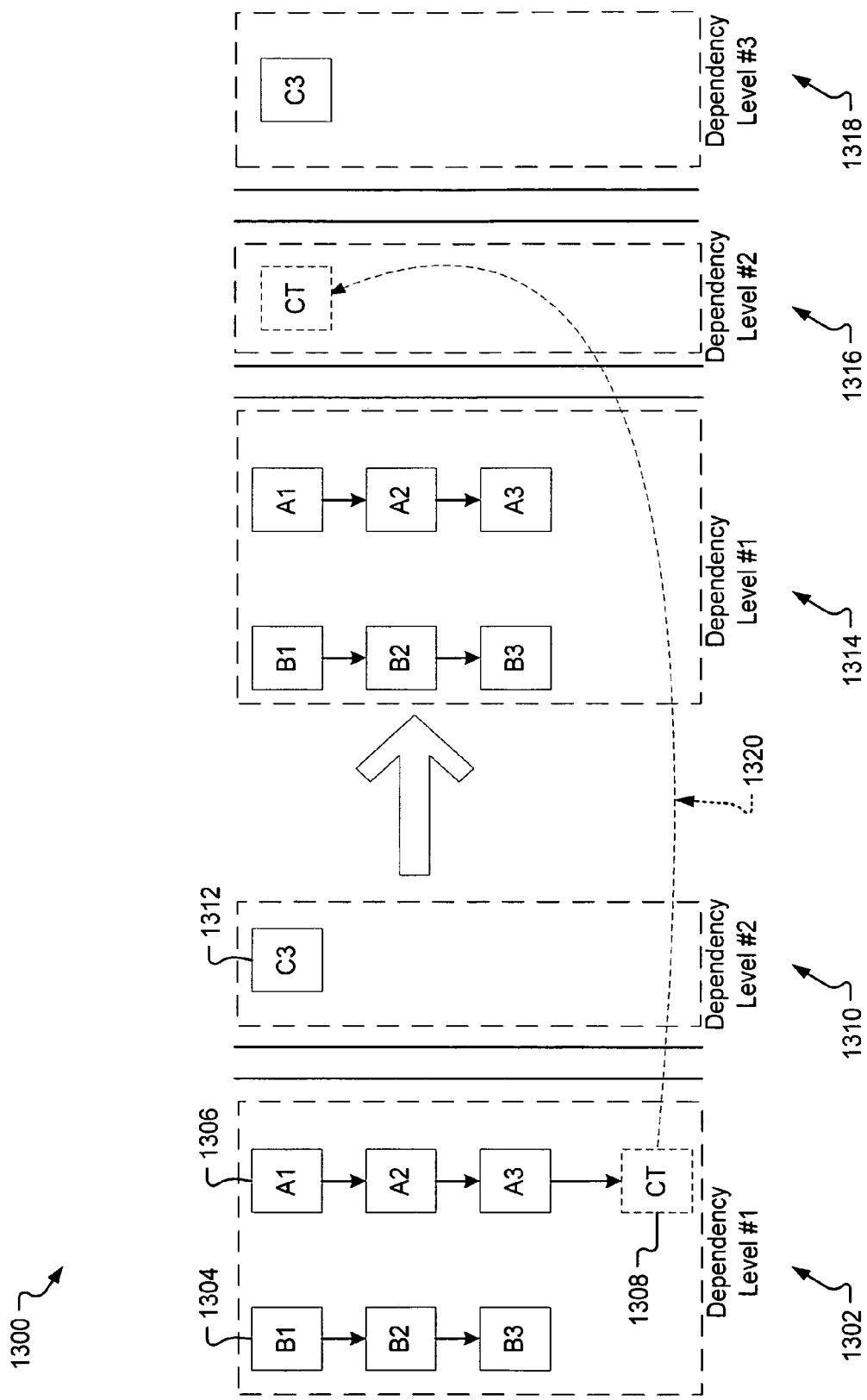
FIG. 13 illustrates a logical representation of the reordering of a control thread formula to the next dependency level in accordance with an embodiment of the present invention.

While steps 1206 and 1212 in FIG. 12 involve the moving of a control thread formula to a new dependency level immediately following the current dependency level, FIG. 13 illustrates a logical representation 1300 of this movement. FIG. 13 shows dependency level #1 (1302) and dependency level #2 (1310) with C3 (1312) located in dependency level #2. Further, control thread formula "CT" (1308) is shown in dependency level #1 (also housing chain 1304 and chain 1306). As discussed, to allow the control thread to perform control-thread-only formulas, an embodiment of the present invention moves the control thread formula 1308 to the linked list of the control thread queue. Then, when the control thread is triggered and assumes control of the operations and reordering, the control thread moves the control thread formula to a new dependency level immediately following the current one. The exemplary embodiment of FIG. 13 thus shows the control thread formula 1308 being moved (1320) to dependency level #2 (1316) and the dependency level housing C3 now becomes a separate dependency level #3 (1318). Only one control thread formula is shown in this embodiment. In another embodiment, multiple control thread formulas could be moved to the new dependency level 1316. Alternatively, each control thread formula could be moved to its own new dependency level following dependency level #1 (1314) and located before dependency level #3 (1318).

In embodiments, control thread formulas are moved to the next dependency level because the control thread will be the thread working at the end of a dependency level. Before triggering the asynchronous threads to begin evaluations in the next dependency level, the control thread can first determine whether there are any control thread formulas that need to be executed prior to triggering the asynchronous threads. Moving a control thread formula to a separate dependency level allows for multi-thread processing to continue while, at the same time, allowing for control-thread-only operations. While FIG. 13 shows three dependency levels, any number of such levels may exist, and the exemplary nature of the embodiment shown herein is not intended in any way to limit the number of such possible dependency levels.

Figure 14A:
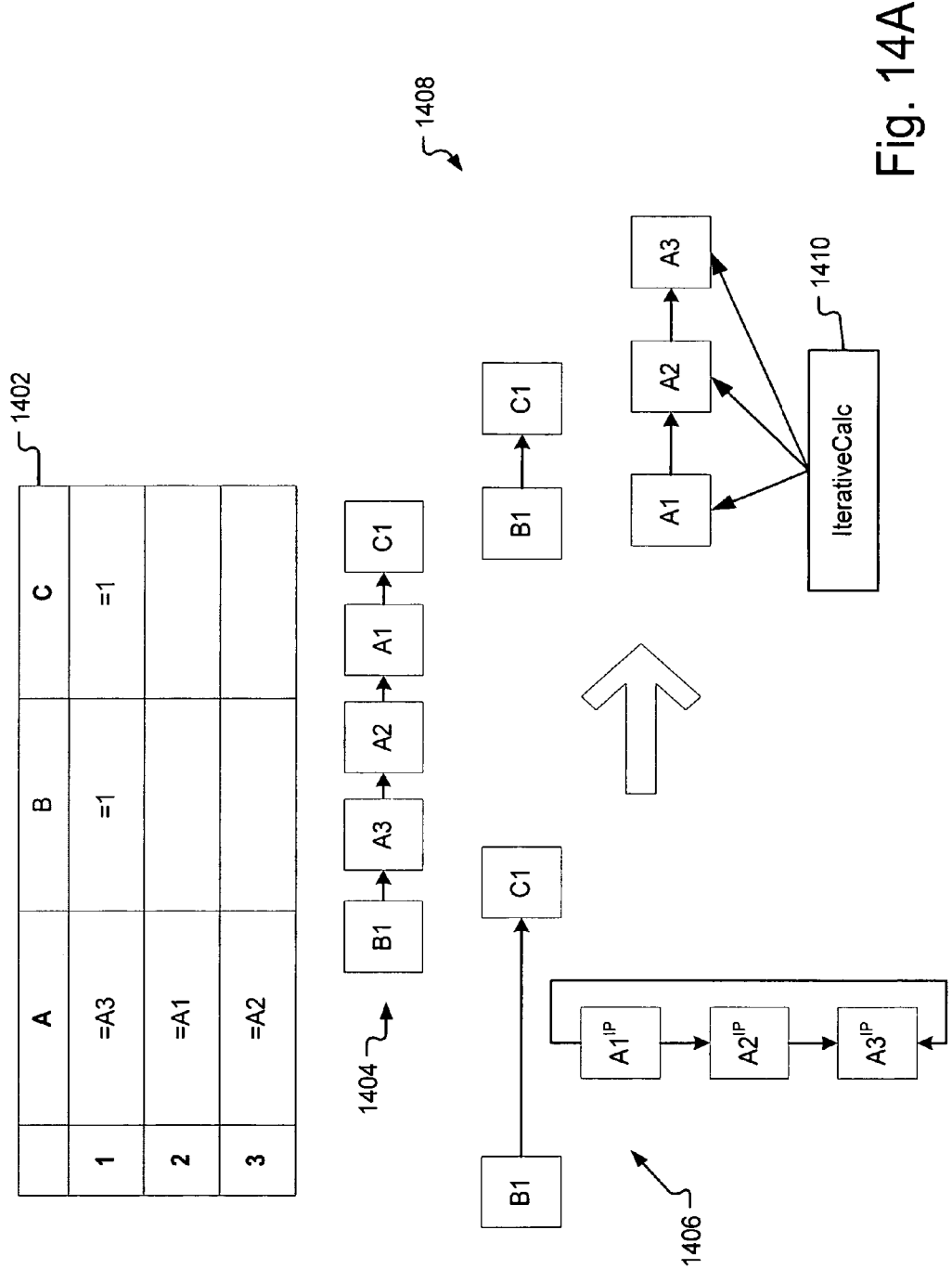
FIG. 14A illustrates the treatment of circular formulas with multi-thread processing in accordance with an embodiment of the present invention.

An embodiment of the present invention, as logically represented in FIG. 14A, further allows for a spreadsheet application with multi-processing capabilities to perform circular reference calculations (i.e., those calculations dependent upon each other) within the multi-thread processing of a unified calculation chain. Spreadsheet 1402 shows cells A1 through A3 with circular reference contingencies. In other words, the formula in cell A1 is dependent upon A3, which is dependent upon the formula A2, which, in turn, is dependent upon A1 itself. To solve this circular reference problem, an embodiment of the present invention allows for the circular reference cells to be taken out of, or disconnected from, the unified chain and placed in a single chain calculation, i.e., a calc chain without child chains or dependency levels, for calculating using a single thread. With a single chain calculation, as opposed to a unified one involving child relationships and/or dependency levels, an iterative function may perform iterative calculations upon the chain to converge on a final value. IterativeCalc 1410 is an example of such a function; however, any type of iterative function for calculating circular dependencies may be used in accordance with embodiments of the present invention.

To create a single chain calculation for iterative circular computation, the cells are first placed in a single calculation chain 1404 as discussed above (i.e., based on their entry into the spreadsheet 1402). In this exemplary embodiment, B1 is first evaluated and is determined to not be dependent upon any other formula. Next, working down the chain, A3 is determined to be dependent upon A2 and is marked as "In Progress" and is removed from the calc chain so as to become a child of supporting formula A2. Moving down chain 1404 to ENT A2, it is found that A2 depends upon A1. A2 is thus marked as "In Progress" and removed from the calc chain 1404 to the child position of supporting formula A1. In moving A2 to the child position of A1, A2 takes A3 with it. Next, moving down chain 1404 to A1, A1 is attempted to be evaluated. However, it is found that A1 depends on A3 such that there is a circular dependency identified at 1406. A1 is marked as "In Progress," and removed from the calc chain 1404. As a result, A1, A2, and A3 are now completely disconnected from the calc chain 1404 as shown in the reordered chain 1406. Therefore, in the process of iterating through the chain, A1, A2 and A3 will not be processed. Consequently, upon finishing iterating through the chain, A1, A2 and A3 will still be marked as "In Progress" or dirty. In order to process these items, the system keeps track of every formula that is made a child of another formula during the course of the current recalculation process. Next, all the formulas that were made children during the process are checked to see if any of them are still marked as dirty. If so, that formula and all of its children are moved to a flat calc chain 1408, i.e., a calc chain without child chains or dependency levels. This flat calc chain, shown in FIG. 14A at 1408, is then calculated using a single thread. If during the single-threaded calculation, a true circular reference is detected, the calculation may be done iteratively, e.g., by iterative calculation function 1410.

Figure 14B:
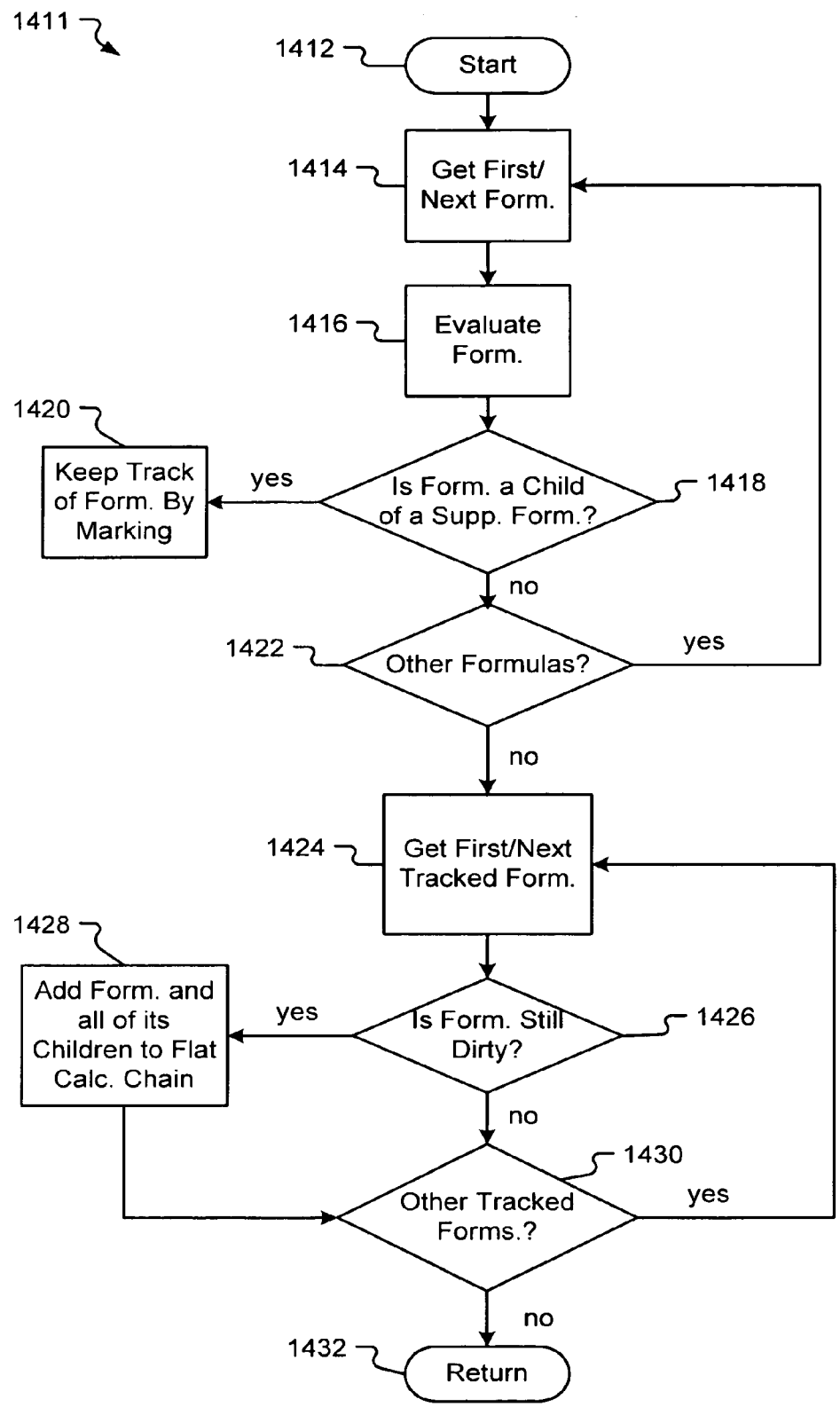
FIG. 14B is a flow diagram illustrating the operational characteristics of a process for reordering a calc chain for possible circular reference detection and evaluation as depicted in the exemplary embodiment of FIG. 14A and in accordance with other embodiments of the present invention.

Turning now to FIG. 14B, process 1411 for reordering a calc chain into a flat calc chain for possible circular reference detection and evaluation is shown in accordance with an embodiment of the present invention. Start operation 1412 is initiated upon creating single calc chain 1404. From start operation 1412, the flow proceeds to get operation 1414 which gets the first formula in calc chain 1404. Evaluate operation 1416 then evaluates this formula. Query operation 1418 determines whether the formula is a child of a supporting formula. If the formula is a child of a supporting formula, flow branches YES to track operation 1420 and the child formula is marked "In Progress" and is kept track of by the system. If the formula is not a child of a supporting formula, flow branches NO to query operation 1422 which determines whether there are any other formulas in calc chain 1404 for processing. If there are more formulas, flow branches YES to get operation 1414 which moves to the next formula in calc chain 1404 for evaluation. If there are no other formulas, flow branches NO to get tracked formula operation 1424, which retrieves the first (or next) formula which has been kept track of from track operation 1420. Next, query operation 1426 determines whether the retrieved tracked formula is still marked as dirty. If the formula is still marked as dirty, flow branches YES to flat calc chain operation 1428, which adds the formula and all of its children to a flat calc chain as shown in flat calc chain 1408, according to an exemplary embodiment of the present invention. If query operation 1426 determines that the tracked formula is not still dirty, flow branches NO to query operation 1430 which determines whether there are any other formulas which have been tracked (or marked as "In Progress"). If there are other tracked formulas, flow branches YES to get first/next tracked formula operation 1424 and steps 1426 through 1430 are repeated. If query operation 1430 determines that there are no other tracked formulas, flow branches NO to return operation 1432. Once a flat calc chain is created through process 1411, this flat calc chain (as created in step 1428 and shown as flat calc chain 1408) may be calculated using a single thread. If during the single-threaded calc, a true circular reference is detected, the formulas may be calculated iteratively. While the tracking language of "In Progress" has been used in this exemplary embodiment (and in describing FIG. 14A), any marking or tracking mechanism may be used in accordance with embodiments of the present invention.

Figure 15:
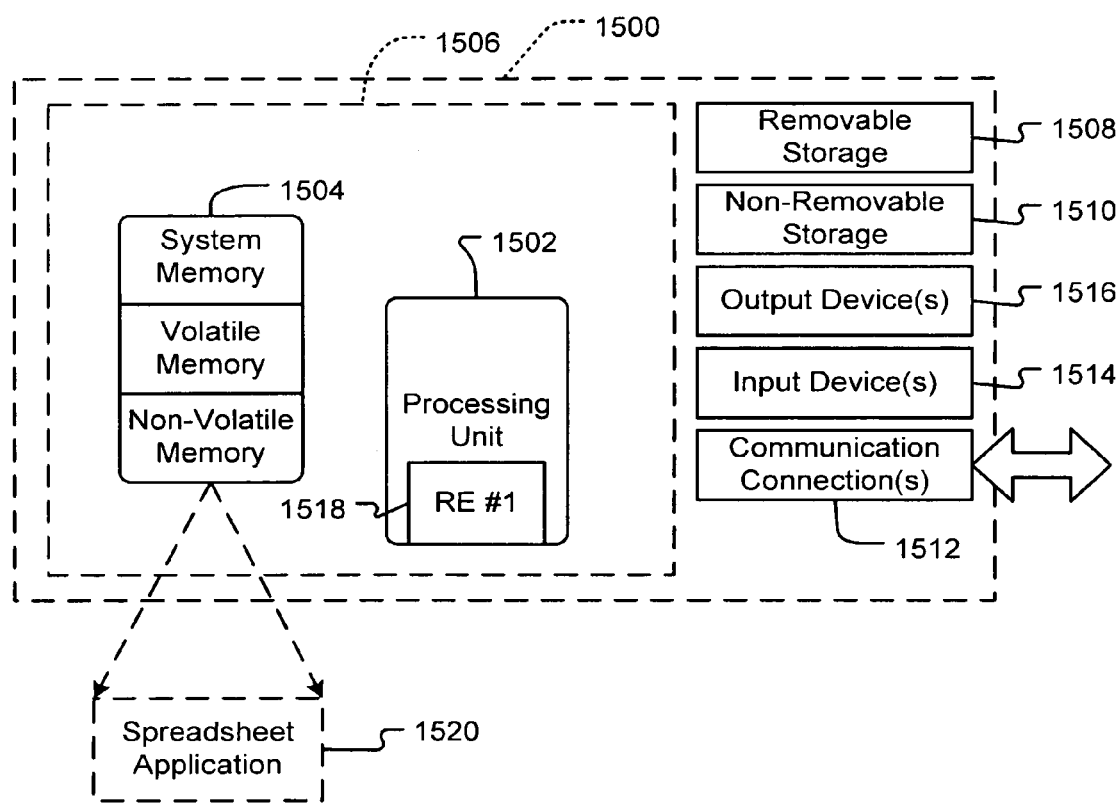
FIG. 15 depicts an exemplary computing system upon which embodiments of the present disclosure may be implemented.

FIG. 15 illustrates an exemplary computing system 1500 upon which the present invention may be implemented. A computer system 1500, which has at least one processor 1502, and at least one recalc engine 1518 operating thereon, is shown in FIG. 2. The system 1500 has a memory 1504, in which a spreadsheet application 1520 is located. In its most basic configuration, computing system 1500 is illustrated in FIG. 15 by dashed line 1506. Additionally, system 1500 may also include additional storage (removable and/or non-removable) including, but not limited to, magnetic or optical disks or tape. Such additional storage is illustrated in FIG. 15 by removable storage 1508 and non-removable storage 1510. Computer storage media includes volatile and nonvolatile, removable and non-removable media implemented in any method or technology for storage of information such as computer readable instructions, data structures, program modules or other data. Memory 1504, removable storage 1508 and non-removable storage 1510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired spreadsheet calculation information, for example, and which can be accessed by system 1500. Any such computer storage media may be part of system 1500. Depending on the configuration and type of computing device, memory 1504 may be volatile, non-volatile or some combination of the two. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System 1500 may also contain communications connection(s) 1512 that allow the device to communicate with other devices. Additionally, to input content into the cells of spreadsheet 400 in accordance with an embodiment of the invention, system 1500 may have input device(s) 1514 such as a keyboard, mouse, pen, voice input device, touch input device, etc. Output device(s) 1516 such as a display, speakers, printer, etc. may also be included, in which such devices may be used to display the spreadsheet 400 to the user in accordance with embodiments of the present invention. All of these devices are well known in the art and need not be discussed at length here.

Having described the embodiments of the present disclosure with reference to the figures above, it should be appreciated that numerous modifications may be made to the present invention that will readily suggest themselves to those skilled in the art and which are encompassed within the scope and spirit of the invention disclosed and as defined in the appended claims. Indeed, while a presently preferred embodiment has been described for purposes of this disclosure, various changes and modifications may be made which are well within the scope of the present invention.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific features and acts described above are disclosed as example forms of implementing the claims. For example, while two recalc engines have been illustrated and discussed in some exemplary embodiments, any number "N" of processors and, thus, recalc engines could be used. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A computer-implemented method of processing formulas in a spreadsheet application, the method comprising:
    ordering, by one or more processors, the formulas into a single calculation chain;
    attempting to evaluate a first formula in the single calculation chain;
    if the first formula is dependent upon a first supporting formula in the single calculation chain, moving the first dependent formula to a child position of the first supporting formula, wherein the moving the first dependent formula to the child position of the first supporting formula results in a first chain comprising the first dependent formula and the first supporting formula;
    attempting to evaluate a second formula in the single calculation chain;
    if the second formula is dependent upon a second supporting formula in the single calculation chain, moving the second dependent formula to a child position of the second supporting formula, wherein the moving the second dependent formula to the child position of the second supporting formula results in a second chain comprising the second dependent formula and the second supporting formula;
    attempting to evaluate all formulas in the single calculation chain until each dependent formula has been made a child of its respective supporting formula, wherein the attempting to evaluate all formulas comprises attempting to evaluate a third formula in the single calculation chain;
    if the third formula is dependent upon a third supporting formula:
        moving the third formula to a child position of the third supporting formula;
        determining if the third formula is also dependent upon a fourth supporting formula, wherein the fourth supporting formula is uncalculated;
        if the third formula is also dependent upon a fourth uncalculated supporting formula, moving the third formula to a second dependency level, wherein a first dependency level comprises the first chain and the second chain, and wherein the first dependency level is separate from the second dependency level;
    processing, by a first processor, the first chain within the first dependency level, wherein the first processor comprises a first recalculation engine; and
    processing, by a second processor, the second chain within the first dependency level, wherein the second processor comprises a second recalculation engine.

2. The computer-implemented method as defined in claim 1, wherein a fifth supporting formula has a fifth dependent formula and a sixth dependent formula and the fifth and sixth dependent formulas are moved to the second dependency level.

3. The computer-implemented method as defined in claim 1, wherein the third supporting formula is itself the child of the second supporting formula, and wherein the fourth supporting formula is itself the child of the first supporting formula.

4. A computer-implemented method of using multiple processors to calculate formulas in a spreadsheet program, comprising:
    determining the number of processors;
    allocating a recalculation engine to each processor;
    maintaining a control thread to synchronize the processing of the recalculation engines;
    ordering the formulas into a single calculation chain;
    attempting to evaluate a first formula in the single calculation chain with the first recalculation engine;
    if the first formula is dependent upon a first supporting formula, moving the first dependent formula and the first supporting formula to a queue for the first recalculation engine;
    attempting to evaluate a second formula in the single calculation chain with the second recalculation engine;
    if the second formula is dependent upon a second supporting formula, moving the second dependent formula and the second supporting formula to a queue for the second recalculation engine;
    continuing to iterate down the single calculation chain until reaching the end of the chain; and
    ordering, by the control thread, the queues for the first and second recalculation engines based on dependent/supporting relationships, wherein the first dependent formula is made a child of the first supporting formula and wherein the second dependent formula is made a child of the second supporting formula.

5. The computer-implemented method as defined in claim 4, wherein the second supporting formula is itself a child of a third supporting formula.

6. The computer-implemented method as defined in claim 4, wherein the method further comprises:
    if the first formula is dependent upon a first supporting formula, marking the first dependent formula to keep track of it;
    determining if the first supporting formula is dependent upon the first dependent formula;
    if the first supporting formula is dependent upon the first dependent formula, marking the first supporting formula to keep track of it;
    upon finishing iterating through the single calculation chain, retrieving the tracked formulas;
    determining if any of the tracked formulas are dirty;
    if any of the tracked formulas are dirty, moving the tracked formula and its child or children to a flat calculation chain without any child chains or dependency levels; and
    calculating the flat calculation chain using a single thread.

7. The computer-implemented method as defined in claim 4, wherein the method further comprises:
 determining whether the first dependent formula is dependent upon an uncalculated second supporting formula; and
 if the first dependent formula is dependent upon the first supporting formula and dependent upon the uncalculated second supporting formula, moving the first dependent formula to a separate dependency level.

8. The computer-implemented method as defined in claim 4, wherein the method further comprises:
 determining whether the first supporting formula has both a first dependent formula and a second dependent formula; and
 if the first supporting formula has both a first dependent formula and a second dependent formula, moving the first and second dependent formulas to a separate dependency level.

9. The computer-implemented method as defined in claim 4, wherein the method further comprises:
 determining whether there are any formulas in the calculation chain to be performed by the control thread only; and
 moving a control-thread-only formula to a separate dependency level.

10. The computer-implemented method as defined in claim 4, wherein a control-thread-only formula is moved to a dependency level immediately following a current dependency level.

11. The computer-implemented method as defined in claim 4, wherein the thread operations of a first recalculation engine are suspended when the thread reaches the end of a dependency level.

12. The computer-implemented method as defined in claim 4, wherein the thread operations of a first recalculation engine are suspended when the first recalculation engine's queue is filled.

13. The computer-implemented method as defined in claim 4, wherein a control-thread-only formula is placed in a queue for such formulas.

14. A computer storage medium having stored thereon computer executable instructions that when executed by a processor perform a method for using multiple processors to calculate formulas in a spreadsheet program, the method comprising:
 determining the number of processors;
 allocating a recalculation engine to each processor;
 maintaining a control thread to synchronize the processing of the recalculation engines;
 ordering the formulas into a single calculation chain;
 attempting to evaluate a first formula in the single calculation chain with the first recalculation engine;
 if the first formula is dependent upon a first supporting formula, moving the first dependent formula and the first supporting formula to a queue for the first recalculation engine;
 attempting to evaluate a second formula in the single calculation chain with the second recalculation engine;
 if the second formula is dependent upon a second supporting formula, moving the second dependent formula and the second supporting formula to a queue for the second recalculation engine;
 continuing to iterate down the single calculation chain until reaching the end of the chain; and
 ordering, by the control thread, the queues for the first and second recalculation engines based on dependent/supporting relationships, wherein the first dependent formula is made a child of the first supporting formula and wherein the second dependent formula is made a child of the second supporting formula.

15. The computer storage medium as defined in claim 14, wherein the second supporting formula is itself a child of a third supporting formula.

16. The computer storage medium as defined in claim 14, further comprising:
 if the first formula is dependent upon a first supporting formula, marking the first dependent formula to keep track of it;
 determining if the first supporting formula is dependent upon the first dependent formula;
 if the first supporting formula is dependent upon the first dependent formula, marking the first supporting formula to keep track of it;
 upon finishing iterating through the single calculation chain, retrieving the tracked formulas;
 determining if any of the tracked formulas are dirty;
 if any of the tracked formulas are dirty, moving the tracked formula and its child or children to a flat calculation chain without any child chains or dependency levels; and
 calculating the flat calculation chain using a single thread.

17. The computer storage medium as defined in claim 14, further comprising:
 determining whether the first dependent formula is dependent upon an uncalculated second supporting formula; and
 if the first dependent formula is dependent upon the first supporting formula and dependent upon the uncalculated second supporting formula, moving the first dependent formula to a separate dependency level.

18. The computer storage medium as defined in claim 14, further comprising:
 determining whether the first supporting formula has both a first dependent formula and a second dependent formula; and
 if the first supporting formula has both a first dependent formula and a second dependent formula, moving the first and second dependent formulas to a separate dependency level.

19. The computer storage medium as defined in claim 14, further comprising:
 determining whether there are any formulas in the calculation chain to be performed by the control thread only; and
 moving a control-thread-only formula to a separate dependency level.

20. The computer storage medium as defined in claim 14, wherein a control-thread-only formula is moved to a dependency level immediately following a current dependency level.

* * * * *